United States Patent [19]
Stanifer et al.

[11] Patent Number: 5,243,530
[45] Date of Patent: Sep. 7, 1993

[54] STAND ALONE MULTIPLE UNIT TRACKING SYSTEM

[75] Inventors: Samuel D. Stanifer, Camarillo; Marcus W. Woodard, Oxnard, both of Calif.

[73] Assignee: The United States of America as represented by the Secretary of the Navy, Washington, D.C.

[21] Appl. No.: 736,560

[22] Filed: Jul. 26, 1991

[51] Int. Cl.⁵ ............................................. G06F 15/50
[52] U.S. Cl. ...................... 364/452; 364/516; 340/990
[58] Field of Search ................ 364/452, 449, 514, 516; 340/990, 991, 992, 993, 995; 342/389, 457; 73/178 R; 370/94.1

[56] References Cited

U.S. PATENT DOCUMENTS

| | | | |
|---|---|---|---|
| 4,318,105 | 3/1982 | Brodeur | 342/389 |
| 4,428,057 | 1/1984 | Setliff et al. | 364/449 X |
| 4,513,377 | 4/1985 | Hasebe et al. | 364/449 |
| 4,777,489 | 10/1988 | Allan | 342/176 |
| 4,791,572 | 12/1988 | Green, III et al. | 364/452 |
| 4,989,204 | 1/1991 | Shimizu et al. | 370/94.1 |
| 5,032,845 | 7/1991 | Velasco | 342/457 |
| 5,153,836 | 10/1992 | Fraughton et al. | 364/452 |
| 5,155,689 | 10/1992 | Worthham | 364/449 |

OTHER PUBLICATIONS

GPS-Based Vessel Position Monitoring and Display System; Reynolds et al.; IEEE AES Magazine; Jul. 1990; pp. 16-22.

Primary Examiner—Thomas G. Black
Assistant Examiner—Michael Zanelli
Attorney, Agent, or Firm—David S. Kalmbaugh; Melvin J. Sliwka

[57] ABSTRACT

A stand alone multiple unit tracking system which utilizes a packet radio link to periodically transmit information identifying the geographic position of ships, aircraft and other land mobile vehicles. The stand alone multiple unit tracking system comprises a base station, relay stations and a plurality of remote stations placed on board ships, aircraft or the like. The remote stations transmit latitude and longitude position information to the base station through relay stations, if required, using packet radio techniques.

6 Claims, 8 Drawing Sheets

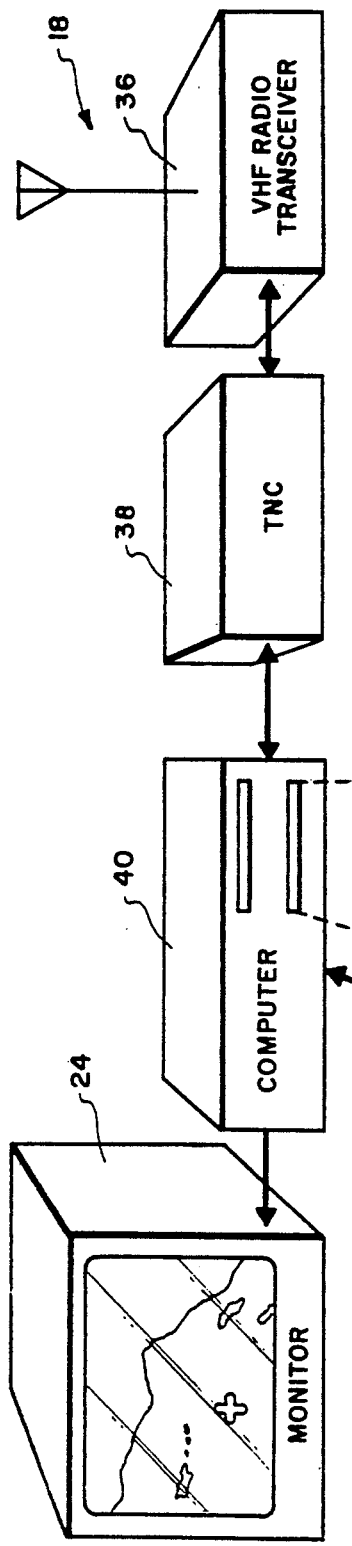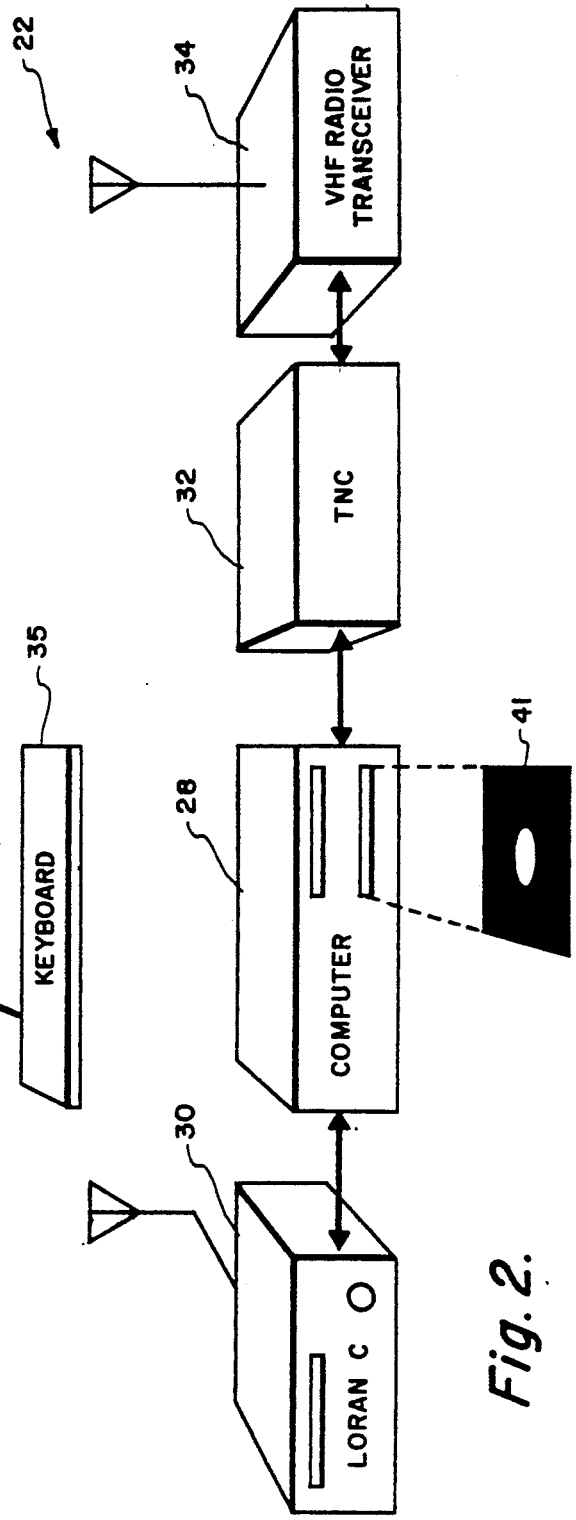

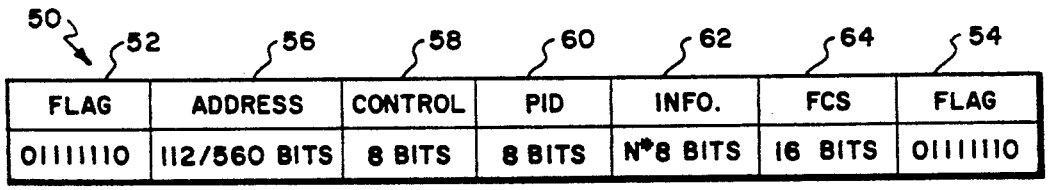

Fig. 3.

| | INITILIZE TNC | REPORT MODE | POSITION REPORT[1] | TERMINATE | QUIESCENT STATE | NORMAL STATE |
|---|---|---|---|---|---|---|
| | INFORMATION | | | | STATUS | |
| CONTROL | $10_H$ | $10_H$ | 0 OR $10_H$ | $10_H$ | $15_H$ | $11_H$ |
| PID | $F0_H$ | $F0_H$ | $F0_H$ | $F0_H$ | N/U | N/U |
| INFO. 1 | $51_D$ | $52_D$ | $49_D$ | $53_D$ | N/U | N/U |
| 2 | $85_D[2]$ | $21_D[2]$ | $60_D[3]$ | $21_D[2]$ | | |
| 3 | $6_D[2]$ | | $45_D[3]$ | | | |
| 4 | | | $146_D[3]$ | | | |
| 5 | | | $50_D[3]$ | | | |
| 6 | | | $52_D[3]$ | | | |
| 7 | | | $5_D[3]$ | | | |
| 8 | | | $187_D[3]$ | | | |

1. POSITION REPORT INDICATES A POSITION OF -119.1228 DEGREES LONGITUDE BY 34.1042 DEGREES LATITUDE.
2. VALUES DEPEND ON NUMBER OF REMOTE STATIONS/SITES.
3. VALUES VARY WITH REMOTE STATION POSITION.

Fig. 5.

| COLUMN BYTE | BASE STATION BAST 2 | REMOTE SITE REMS |
|---|---|---|
| 0 | OUTPUT BUFFER NUMBER | NOT USED |
| 1 | REPORT INTERVAL | NOT USED |
| 2 | BIT 0 — REPORTER<br>BIT 1 — RELAYER | RELAYS PACKED FLAG |
| 3 | RETRY COUNTER | NOT USED |
| 4 | =0 — NO RELAY<br>>0 — LAST RELAY REFERENCE | =0 — NO RELAY<br>>0 — LAST RELAY REFERENCE |
| 5 | MSB ADDRESS CHARACTER | MSB ADDRESS CHARACTER |
| 6 | ADDRESS CHARACTER | ADDRESS CHARACTER |
| 7 | ADDRESS CHARACTER | ADDRESS CHARACTER |
| 8 | ADDRESS CHARACTER | ADDRESS CHARACTER |
| 9 | ADDRESS CHARACTER | ADDRESS CHARACTER |
| 10 | LSB ADDRESS CHARACTER | LSB ADDRESS CHARACTER |
| 11 | RELAYER 1 INDEX | RELAYER 1 INDEX |
| 12 | RELAYER 2 INDEX | RELAYER 2 INDEX |
| 13 | RELAYER 3 INDEX | RELAYER 3 INDEX |
| 14 | RELAYER 4 INDEX | RELAYER 4 INDEX |
| 15 | RELAYER 5 INDEX | RELAYER 5 INDEX |
| 16 | RELAYER 6 INDEX | RELAYER 6 INDEX |
| 17 | RELAYER 7 INDEX | RELAYER 7 INDEX |
| 18 | RELAYER 8 INDEX | RELAYER 8 INDEX |

Fig. 7.

SECOND WORD (8 BITS):
- LSB .0001
- .0002
- .0004
- .0008
- .0016
- .0032
- .0064
- .0128

THIRD WORD (8 BITS):
- LSB .0256
- .0512
- .1024
- .2048
- .4096
- .8192
- 1.6384
- 3.2768

FOURTH WORD (8 BITS):
- LSB 6.5536
- 13.1072
- 26.2144
- 52.4288
- 104.8576
- SIGN 0 — + EAST
- 1 — − WEST

| BYTE | COLUMN 0 | 1 | 2 | 3 |
|---|---|---|---|---|
| 0 | 0 | 0 | 0 | 0 |
| 1 | 0 | 0 | 0 | 0 |
| 2 | 0 | 0 | 0 | 0 |
| 3 | 0 | 0 | 0 | 0 |
| 4 | 0 | 13 | 0 | 0 |
| 5 | 80(P) | 80(P) | 80(P) | 80(P) |
| 6 | 76(L) | 76(L) | 76(L) | 76(L) |
| 7 | 80(P) | 80(P) | 80(P) | 80(P) |
| 8 | 48(O) | 48(O) | 48(O) | 48(O) |
| 9 | 48(O) | 48(O) | 48(O) | 48(O) |
| 10 | 49(4) | 50(1) | 51(3) | 53(5) |
| 11 | 0 | 2 | 0 | 0 |
| 12 | 0 | 3 | 0 | 0 |
| 13 | 0 | 0 | 0 | 0 |
| 14 | 0 | 0 | 0 | 0 |
| 15 | 0 | 0 | 0 | 0 |
| 16 | 0 | 0 | 0 | 0 |
| 17 | 0 | 0 | 0 | 0 |
| 18 | 0 | 0 | 0 | 0 |

Fig. 8.

| BYTE | COLUMN 0 | 1 | 2 | 3 | 4 |
|---|---|---|---|---|---|
| 0 | 0 | 0 | 0 | 0 | 0 |
| 1 | 0 | 0 | 0 | 0 | 0 |
| 2 | 0 | 1 | 0 | 0 | 1 |
| 3 | 0 | 0 | 3 | 2 | 0 |
| 4 | 0 | 0 | 12 | 0 | 13 |
| 5 | 80(P) | 80(P) | 80(P) | 80(P) | 80(P) |
| 6 | 76(L) | 76(L) | 76(L) | 76(L) | 76(L) |
| 7 | 80(P) | 80(P) | 80(P) | 80(P) | 80(P) |
| 8 | 48(O) | 48(O) | 48(O) | 48(O) | 48(O) |
| 9 | 48(O) | 48(O) | 48(O) | 48(O) | 48(O) |
| 10 | 49(1) | 50(2) | 51(3) | 53(5) | 52(4) |
| 11 | 0 | 0 | 3 | 0 | 3 |
| 12 | 0 | 0 | 0 | 0 | 2 |
| 13 | 0 | 0 | 0 | 0 | 0 |
| 14 | 0 | 0 | 0 | 0 | 0 |
| 15 | 0 | 0 | 0 | 0 | 0 |
| 16 | 0 | 0 | 0 | 0 | 0 |
| 17 | 0 | 0 | 0 | 0 | 0 |
| 18 | 0 | 0 | 0 | 0 | 0 |

Fig. 6B.

FIFTH WORD — 8 BITS:
- LSB .0001
- .0002
- .0004
- .0008
- .0016
- .0032
- .0064
- .0128

SIXTH WORD — 8 BITS:
- LSB .0256
- .0512
- .1024
- .2048
- .4096
- .8192
- 1.6384
- 3.2768

SEVENTH WORD — 8 BITS:
- LSB 6.5536
- 13.1072
- 26.2144
- 52.4288
- 104.8576
- SIGN 0 — +NORTH, 1 — −SOUTH

STAND ALONE MULTIPLE UNIT TRACKING SYSTEM

BACKGROUND OF THE INVENTION

1. Field of the Invention

This invention relates generally to navigational systems for use with ships or aircraft and more particularly to an aircraft or ship navigation system which uses packet radio technology to remotely report position information.

2. Description of the Prior Art

Prior art methods of remotely determining the position of ships or aircraft normally involve the use of systems with a beacon on the ship or aircraft whose position is being tracked and then reported, or radar systems which track a ship or aircraft by means of microwave energy reflected from the ship or aircraft being tracked. Other methods involve multilateration of a beacon signal from multiple receiving sites. Using these prior art methods, a complex and expensive ground station sends interrogation signals to ships or aircraft being tracked. Return signals indicate ranges to the beacon on the ship or aircraft whose position is being tracked. Actual geographic or relative position of the aircraft or ship is then calculated by computers inherent within these systems. These systems tend to be complex, physically large, expensive and are not easily deployed.

Systems used for remote position monitoring/tracking of ships and aircraft in weapons test and evaluation applications are typically radars and multilateration tracking systems. Test ranges incorporate various types of radar for surface and air surveillance or precision tracking of vehicles under test. These radars are normally shore-based and their coverage does not extend above the horizon. Multilateration systems can extend their coverage over the horizon only if a complex and expensive transponder is installed in the unit to be tracked as well as aboard a relay aircraft.

Packet systems have been known for several years: see for example "Computer Networks" by Andrew S. Tanenbaum, published by Prentice Hall (1981) and "Advances in Packet Radio Technology" by R. E. Kahn et. al., Proc. IEEE, Vol. 66 (November 1978), pages 1468-1496. A packet radio system is a data communications radio network comprising a plurality of stations.

Generally, packet radio communication systems include a plurality of stations each covering a respective zone. A data message to be communicated is divided into discrete segments of fixed length, called "packets". Packets are transmitted from a station of origin to a destination station and if the packets are received by the destination station without error, an acknowledgement is provided by the destination station. Thus, two way communication may be accomplished by two or more stations within a network.

Specifically, packet radio communications systems may have a central station that administers a plurality of remote stations each covering a respective zone. In response to a polling packet from the central station, data packets are assembled at the remote stations and transmitted to the central station. When the packets arrive at the central station, the central station transmits an acknowledgement of that fact.

Packet radio systems have many uses in the communications field, such as, providing mobile battlefield data users with a common communications service which is comparable in terms of service and reliability to a static system. U.S. Pat. No. 4,989,204 to T. Shimizu et. al. is illustrative of a packet radio communication system which provides for mobile stations and may be used in tactical mobile areas of a forward battlefield. However, packet radio technology has not been utilized to remotely report aircraft or ship locations.

SUMMARY OF THE INVENTION

It is therefore an object of the present invention to provided a relatively simple, inexpensive and easy to install position reporting system.

It is another object of the present invention to provide an autonomous means of position reporting independent of other ship/aircraft systems which would interface with on board ship/aircraft navigation systems.

It is yet another object of the present invention to provide a position reporting system whereby external monitoring of transmitted radio packets is permitted which allows for ships and aircraft to be tracked and displays to be provided showing the position of each ship and aircraft in the area.

It is still another object of the present invention to provide a position reporting system which would allow for rapid and inexpensive setup for aircraft tracking and control at small airports where radars are not in the vicinity or cannot be justified in terms of cost.

It is a further object of the present invention to provide a low cost tracking system for offshore vessels in congested areas with fixed site local hazards being permanently entered into shore station monitoring stations to be transmitted to ships at periodic intervals.

These and other objects of the present invention are accomplished by a stand alone multiple unit tracking system which utilizes packet radio technology to periodically transmit information identifying the geographic position of ships, aircraft and other land mobile vehicles by means of a packet radio link. The stand alone multiple unit tracking system of the present invention comprises a base station, relay stations and a plurality of remote sites or stations placed on board ships, aircraft or the like. The base station includes a VHF radio transceiver, a terminal node controller, a cathode ray tube display device and a personal computer, while each remote station includes a Loran-C device, a personal computer, a terminal node controller and a radio transceiver.

The packet radio links which transmit position information/data between the remote sites and the base station operate on a simplex channel, that is, one channel is used to both transmit and receive information. Each station within the stand alone multiple unit tracking system of the present invention monitors the simplex channel and when it has information to send checks to see if the channel is busy transmitting or receiving. If the channel is busy, the station with information to send or transmit waits until the channel is clear. When the simplex channel clears, the station transmits and if the transmission is successful an acknowledge message will be provided by the receiving station. If two or more stations transmit at the same time, then the data from both stations collides and the transmitting stations will not receive an acknowledge message, each station then waits a programmed time period and transmits again. Time periods are different at each station which allows for successful transmission by each station within the system.

The Loran C device at each remote station provides position data that is the latitude and longitude of the remote station as well as data which indicates the quality of the position data being provided. The computer at the remote station generates "packet" radio frames in accordance with the AX.25 Amateur Packet-Radio Link-Layer Protocol to transmit latitude and longitude position data from the remote station to the base station. The terminal node controllers at the remote stations function as modems passing the "packets" of position data between the remote station computer and the transceiver, provide for transceiver control so that each remote station may be successfully linked to reliably transport position data between the stations and provide a High Level Data Link Control (HDLC) frame check sequence for error free transmission of position data between stations.

When the base station receives the "packets" of positional data from the remote sites, the computer at the base station will sift through the positional data and correlate the data so that it may be combined into a single intelligible form for presentation by the cathode ray tube display.

BRIEF DESCRIPTION OF THE DRAWINGS

FIG. 1 is a functional block diagram of the base station of the present invention;

FIG. 2 is a functional block diagram of a remote station of the present invention;

FIG. 3 is an illustration of the AX.25 Amateur Packet-Radio Link-Layer Protocol frame employed by the present invention during the transmit and receive modes of the base and remote stations;

FIG. 5 is a table illustrating the message formats used by the multiple unit tracking system of the present invention;

FIGS. 6A and 6B illustrate the binary format for longitude and latitude positional data provided by a remote station of the present invention;

FIG. 7 defines the user table for the base station and remote station software;

FIG. 8 is an example of the user table of FIG. 7 for the base station;

FIG. 9 is an example of the user table of FIG. 7 for a remote station;

DESCRIPTION OF THE PREFERRED EMBODIMENT

Figure 4:
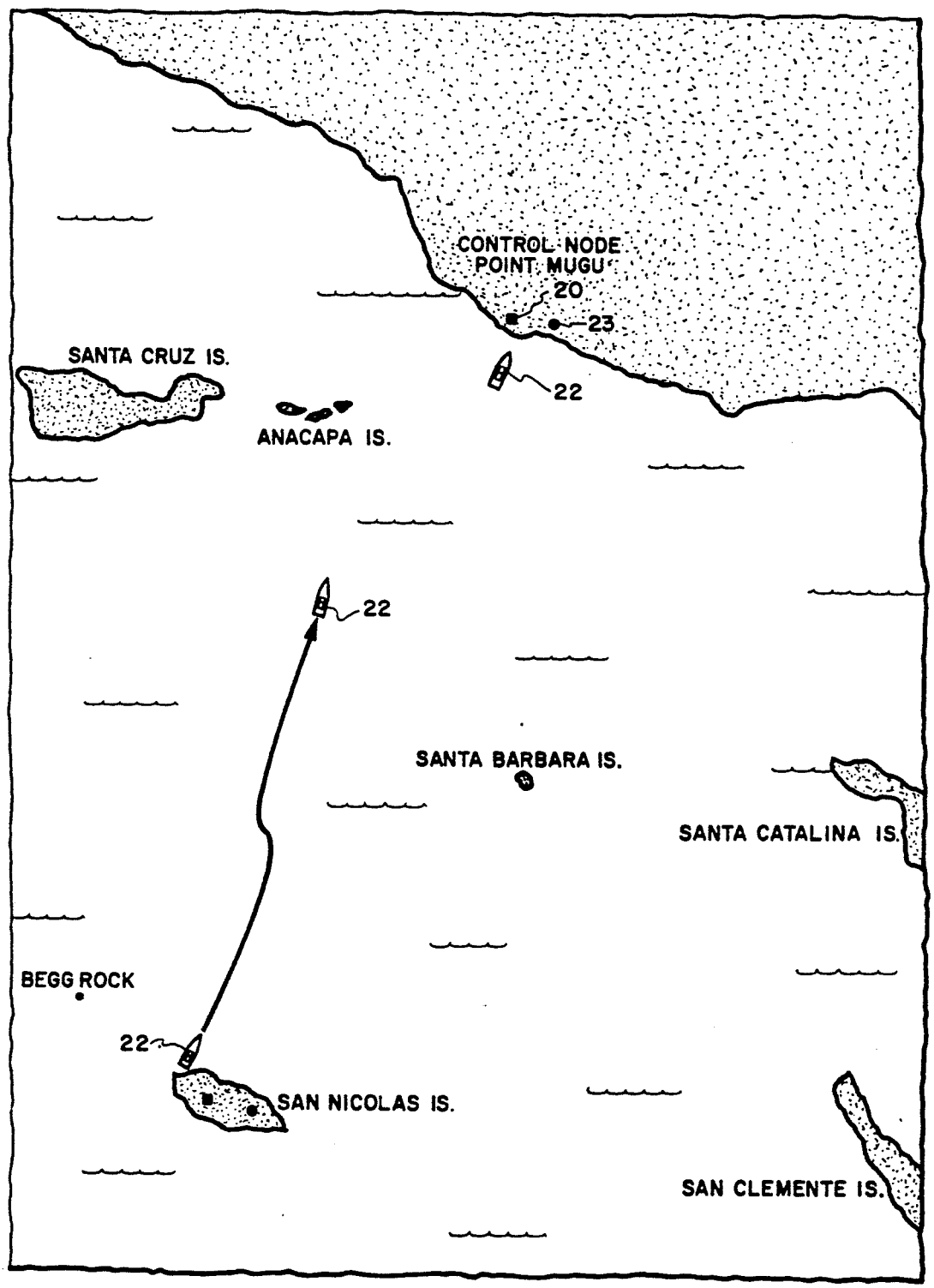
FIG. 4 illustrates a range map which appears on a monitor at the base station and which depicts the location of the base station and each remote station of the present invention.

Referring first to FIGS. 1 and 2 the multiple unit tracking system 18 of the present invention comprises a base station 20 and one or more remote stations 22 with the base station 20 being adapted to receive positional data from each remote station 22 and then sift through the positional data and correlate the data so that it may be combined into a single intelligible form for viewing on a cathode ray tube display 24 or such other devices as are customarily used to display information to an operator.

At each remote station 22, a personal computer 28 accepts data from a Loran-C 30 which establishes the longitudinal and latitudinal position of a ship, an aircraft or a vehicle respectively on the sea, in the air or on land. Personal computer 28 assembles the positional data into a "packet" or frame format, provides the "packet" to a terminal node controller 32 and coordinates with the base station 20 the transmission of positional data provided by Loran-C 30. Terminal node controller 32, in turn, controls the transmission of this positional data by a VHF radio transceiver 34 to the base station 20 by keying transceiver 34 whenever transceiver 34 needs to send data.

Figure 12:
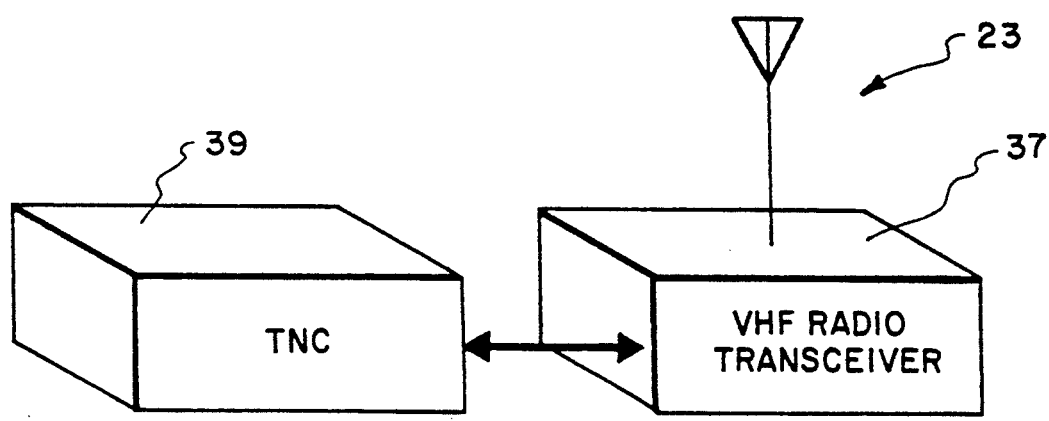
FIG. 12 is a functional block diagram of a relay station of the present invention.

Referring to FIGS. 4 and 12, it should be noted at this time that the multiple unit tracking system of the present invention may utilize repeater/relay stations 23 which relay position data from a remote station 22 to the base station 20. The relay station 23 utilizes the same computer equipment as the remote station, but generally does not include a Loran-C 30 since its function is to relay information or data "packets" between the base station and the remote stations. However, it should also be understood that a remote station 22 may also be utilized as a relay station 23. Further, it should be understood that a relay station 23 may require only a VHF transceiver 37 and a terminal node controller 39 to relay information when the terminal node controller adheres to AX.25 Amateur Packet-Radio Link-Layer Protocol.

Referring to FIGS. 1 and 2, base station 20 includes a VHF radio transceiver 36 for receiving positional information packets/frames transmitted by each remote station 22, a terminal node controller 38 which provides the positional information in the "packet" format to a personal computer 40. Personal computer 40 then disassembles and processes the positional information for a map display on cathode ray tube display 24 or for display by printer 26.

In the preferred embodiment of the present invention remote station equipment does not require operator intervention. Upon application of power, the remote site Loran C 30, computer 28, terminal node controller 32 initialize and remain quiescent until activated by base station 22. Base station 22, following power up and software loading, interacts with a human operator utilizing a keyboard 35 to identify the remote station links and relay stations 23 to be used by multiple unit tracking system 18 Base station 20 next attempts to establish contact with each remote station 22 and inform the operator of the remote station's status. If the operator instructs system 18 to continue, base station 20 instructs each remote station 22 to transmit its position to the base station, which is overlaid on a range map 42, FIG. 4, appearing on monitor 24.

Base station 20 also performs a link monitoring function. Base station 20 maintains for each remote station 22 a built-in software time period which is up to five times the remote station's reporting period. If a remote station's message is not received within this time period the operator is informed of a time-out or inactivation of the remote station 22 and the base station 20 periodically transmits a request for status to the remote station 22 in an attempt to reactivate station 22.

The reporting period in seconds for each remote station 22 is calculated as follows:

Report Period = (Total Number of Remote Stations + 1) +
(Number of Relay Stations to the Remote Station × 2) +
(User Table Column ÷ 10)

The inclusion of the factor User Table Column ÷ 10, where the User Table Column is the column the remote station appears in the base station user table illustrated by FIG. 8, provides a variable for calculating the reporting period for each remote station: thus reducing the possibility that two remote stations will report during the same time interval.

Base station 20 also sends an acknowledge message when requested by each remote stations 22. After ten position reports have been sent by a particular remote station 22, it begins to request an acknowledge from base station 20. If the remote station 22 does not receive an acknowledge message from base station 20 after sending twenty position messages, the remote station 22 resets to a quiescent state. This procedure prevents the remote station 22 from continuing to transmit position messages indefinitely should the system data links fail to connect or not operate properly. Each remote station 22 does not request an acknowledge after every position report as this would greatly increase the messages transmitted and thus increase the chances of data collision.

The terminal node controllers 32 and 38 used in the preferred embodiment of the present invention operate at 1200 Baud, are manufactured by Kantronautics Inc. and are their version 2.85 Terminal Node Controller. Terminal node controllers 32 and 38, in turn, make use of the AX.25 Amateur Packet-Radio Link-Layer Protocol to provide a means for the reliable transport of data between the base station 20 and each remote station 22.

As is best illustrated by FIG. 3, each frame 50 or "packet" of data consists of a pair of eight bit flags 52 and 54 respectively at the beginning and end of the frame which are generated by controllers 32 and 38 and which delimit the frame. For the multiple unit tracking system 18 flags 52 and 54 are set at 0, 1, 1, 1, 1, 1, 1, 0.

Frame 50 also includes an address field 56 provided by computers 28 and 40 which is used to identify both the source of the frame and the destination of the frame, as well as one or more intermediate stations which may be used to relay data from the source to the destination. In the AX.25 Amateur Packet-Radio Link-Layer Protocol, the destination address subfield of the address field 56 consist of seven octets/eight bit bytes and is sent first to allow each receiving station 20 or 22 of the frame to check the destination address subfield to see if the frame 50 is being addressed to that particular receiving station while the rest of the frame is being transmitted. The source address subfield is then sent in seven octets/eight bit bytes. The AX.25 Amateur Packet-Radio Link-Layer Protocol also provides for a repeater or relay address subfield consisting of seven octets/eight bit bytes appended to the end of the address field. The link-layer AX.25 protocol further provides for up to eight repeaters or relay stations 23 by extending address field 56 to 512 binary bits. When there is more than one repeater or relay address in the address field the repeater address immediately following the source address subfield is considered the address of the first repeater or relay station 23 of a multiple relay station chain.

The frame of FIG. 3 also includes an eight bit control field 58 which provides status and control information; an eight bit protocol identifier field (PID) 60 which for purposes of the present invention is an arbitrary eight bit digital word "F0" hexadecimal or 1, 1, 1, 1, 0, 0, 0,0 binary selected to occupy the field; and an information field 62 which may consist of up to 256 octets/eight bit bytes and is used to convey latitude and longitude positional data between the remote stations 22 and the base station 20 and any repeater or relay stations 23 which is used to relay positional information between the remote stations 22 and the base station 20.

Referring to FIGS. 3 and 5, messages which are information or status frames provided by multiple unit tracking system 18 conform to the AX.25 Version 2.0 packet-radio link layer protocol except for eight bit control field/word 58. The address field 56 is defined by AX.25 Version 2.0 packet-radio link layer protocol. Certain bits in control field 58 have been redefined for use by the multiple unit tracking system 18 of the present invention.

The messages transmitted by each remote station 22, an intermediate station or base station 20 are either information frames or status frames as defined by bit zero of the control field 58. An information frame is identified by a zero in bit zero of control field 58, while a status frame is defined by a one in bit zero of control field 58. In accordance with the AX.25 packet-radio link layer protocol, bit four of a status word is used to request a reply or to indicate a response to a request. The PID field for the information frames is set to F0 hexadecimal as is best illustrated by FIG. 5.

The four information frames messages used by multiple unit tracking system 18 are Initialize Terminal Node Controller (TNC), Report Mode, Position Report and Terminate.

The Initialize Terminal Node Controller message directs each remote station 22 to initialize its terminal node controller 32 with a Slottime value and a Persistence value which are contained in the message. The control field 58 is 10 hexadecimal which indicates an information frame and a request for response. The first word of the information field 62 is the message type of 51. hexadecimal which is a predetermined number selected to indicate the Initialize Terminal Node Controller message, thereby informing the remote station of the message purpose. The second word is the Persistence value for the terminal node controller 32 at the remote station. The third word is the Slottime value for the terminal node controller 32 at the remote station.

Terminal node controllers 32 and 38 use a mode of operation identified as KISS which is embedded in the firmware of the terminal node controller to allow communication respectively with computers 28 and 40. The KISS mode of operation allows terminal node controllers 32 and 38 to transfer all received data respectively to computers 28 and 40 for processing by the computers. In the KISS mode of operation terminal node controllers 32 and 38 each convert received HDLC type synchronous data frames into an asynchronous frame format which is then provided to the serial port of computer 28 or 40; likewise asynchronous data frames from computers 28 and 40 are respectively transmitted by transceivers 34 and 36 once the data is converted from an asynchronous format to HDLC synchronous format by terminal node controllers 32 and 38. Terminal node controllers 32 and 38 also determine proper timing for channel access. It should be understood by those skilled in the communications art that there are a number of commercially available terminal node controllers which will convert between asynchronous data frames and a synchronous HDLC type frame format for either transmission or reception by a radio transceiver. It should also be understood that while terminal node controllers 32 and 38 are capable of performing full AX.25 Amateur Packet-Radio Link-Layer Protocol functions, protocol responsibility is off-loaded to computers 28 and 40.

In the KISS mode of operation, channel access is determined by two settings in the terminal node controllers 32 and 38 PERSISTENCE and SLOTTIME. In the preferred embodiment of the present invention PERSISTENCE is calculated by the following expression:

$$\text{PERSISTENCE} = 256/(\text{number of sites} + 2) \qquad (1)$$

Thus, for example, if there are eight sites or stations in multiple unit tracking system 18, PERSISTENCE would be set at 26. SLOTTIME is a predetermined time period set at fifty milliseconds.

When the terminal node controller 32, for example, at each remote station 22 detects that the channel is clear and available, that is no carrier is detected, the terminal node controller starts an internal timer which is set at fifty milliseconds (SLOTTIME). When the timer expires the terminal node controller generates a random number between 0 and 255. If the generated number is equal to or less than the PERSISTENCE value, the terminal node controller 32 keys up the transceiver 34 and sends a data packet. With a setting of 26 the odds of this occurring after the first slottime are about 1 in 9 with the actual odds being the PERSISTENCE value plus 1 divided by 256. If the terminal node controller 32 generated random number is greater than PERSISTENCE value, the terminal node controller 32 restarts the timer and waits for the timer to expire again before generating a new random number. This procedure is repeated until terminal node controller 32 gains channel access and sends its packet of information.

Data received, for example, from transceiver 36 is converted into asynchronous format by terminal node controller 38 and sent to computer 40. The data actually sent over the serial port of the computer is formatted with special control information, allowing the computer to determine the type of data being received from the Terminal node controller.

All information flowing from the terminal node controller to the computer in the KISS mode of operation is data, special messages are not sent from the terminal node controller to the computer in the KISS mode of operation. The only data flowing from the terminal node controller to the computer is the data received through the radio transceiver link. Every "frame" of data sent from the terminal node controller will begin and end with a special FEND character which is the ASCII code $C0 (hexadecimal) or 192 decimal. The second byte of the data will be the data type, and will always be a $00 hexadecimal which means that the following information is data. If the data actually contains the FEND character ($C0) it will be necessary to tell the computer that the $C0 the computer receives is not the end of the frame, but simply is more data. This function is accomplished by replacing the $C0 character with a special sequence consisting of a FESC ($DB hexadecimal) followed by a TFEND character $DC hexadecimal. One final special sequence which may be sent from the terminal node controller to the computer is a FESC ($DB hexadecimal) followed by TFESC ($DD hexadecimal) which is translated into $DB by the computer program.

When data flows from the computer to the terminal node controller, there are five possible commands in the KISS mode of operation that may be provided the terminal node controller from the computer which are setup parameters. These parameters are commands needed to set TXDELAY, PERSISTENCE, SLOTTIME, FULLDUP, and finally, a command to exit the KISS Mode of operation. The only other data which the computer may send to the terminal node controller in the KISS mode of operation is data which is to be transmitted over the radio transceiver (HDLC) channel. The data provided by the computer to the terminal node controller must also begin and end with the same FEND $C0 hexadecimal character used for data coming from the terminal node controller to the computer. All special character sequences must also be used to send the FEND, and FESC characters as data.

Each of the commands is assigned a command type number in hexadecimal as follows: 00-Data is to be transmitted; 01-TXDELAY, second byte contains TXDELAY in ten millisecond increments; 02-PERSISTENCE, second byte contains persistence value; 03-SLOTTIME, second byte contains slot interval; 05-FULLDUP—if second byte is 0 sets fulldup mode, otherwise turns fulldup off; 255-KISS, causes exit from KISS Mode. For example, if it is desired to send a data packet in the KISS mode of operation, the computer sends the following bytes to the terminal node controller: C0, 00, 68, 65, 6C, 6C, 6F, C0. It is important to note that this data packet does not contain any addressing information, and therefore cannot be sent via the AX.25 protocol. All of the addressing and formatting of the addresses is programmed in the computer and sent as a data packet to the terminal node controller.

It should also be noted that only the PERSISTENCE and SLOTTIME commands are used in the preferred embodiment of the present invention.

Referring again to FIGS. 3 and 5 the Report Mode message directs each remote station 22 to begin sending position reports to base station 20. The control field 58 is 10 hexadecimal which indicates an information frame and a request for response. The first word of information field 62 is a message of 52 decimal which is a predetermined number selected to indicate Report Mode. The second word of the information field 62 is a value which is ten times the report interval of the remote station in seconds, that is the time required for each remote station 22 to transmit data to base station 20. The second word of the information field 62, in turn, indicates to each remote station 22 how often the remote station reports its position to base station 20.

The Position Report message informs base station 20 of the Latitude and Longitude position of the remote station 22. The control field 62 is either 0 or 10 hexadecimal depending upon whether a response is requested or not. The first word of the information field 62 is the message type of 49 decimal which is a predetermined number selected to indicate Position Report. The second, third, and fourth words or eight bit bytes, FIG. 6(a) of the information field 62 contain the Longitude position information. The least significant bit (LSB) values of the second, third and forth words are respectively 0.0001, 0.0256, and 6.5536 degrees. Bit seven of word four is set at a logic "1" state to indicate a negative or west Longitude and a logic "0" to indicate an east Longitude. In a similar manner the fifth, sixth and seventh words, FIG. 6(b), of information field 62 contain Latitude position information with the LSB values of the fifth, sixth and seventh words being respectively 0.0001, 0.0256, and 6.5536 degrees. Bit seven of word four is set at a logic "1" state to indicate a negative or south Latitude and a logic "0" to indicate a north Latitude. The eighth word contains the quality value of the position data provided by Loran 30 which is a number from 0–255. Quality numbers higher than 64 are considered suitable for navigation.

The Terminate message informs the remote station to enter the quiescent state. It is identical to the Report Mode message except the message type is 53 decimal.

There are two types of status messages used in multiple unit tracking system 18. When requested by base station 20, a 15 hexadecimal in control field 58 sent by a remote station indicates that the remote station is in a quiescent state. When requested by base station 20, a 11 hexadecimal in control field 58 sent by a remote station indicates that the remote station is in an operational mode. An 11 hexadecimal in control field 58 sent by base station 20 is an acknowledge to a remote stations request for a response.

Referring to FIG. 3 terminal node controllers 32 and 38 also provide a sixteen bit frame-check sequence field 64 which insures that the frame is not corrupted by the medium used to transmit the frame from the sender to the receiver. The frame-check sequence field 64 is a High Level Data Link Control (HDLC) type control procedure whereby the receiving station checks the incoming frames for transmission errors. In the KISS mode of operation messages with errors are not passed to computers 28 and 40.

Terminal node controllers 32 and 38 also determine proper timing for channel access to allow for the transmission of information between the base station 20 and each remote station 22.

In the preferred embodiment of the present invention the AX.25 Amateur Packet-Radio Link-Layer Protocol responsibility is off-loaded to computers 28 and 40 which use BAST2.BAS and REMS.BAS applications software to perform the AX.25 Protocol functions, that is the applications software is utilized to assemble and disassemble the "packets" or frames for transmission of positional data from each remote station 22 to base station 20. The program listing for this applications software is set forth below and is referred to by program listing line numbers in the following discussion of the operation of the multiple unit tracking station 18 of the present invention.

When each remote station 22 is powered up, the application software on remote station's computer 28 automatically loads and runs. The program loaded on computer 28 at each remote station 22 immediately jumps to an Initialization subroutine beginning at line 310. The base station software program is defined as BAST2.BAS and set forth at lines 10–4750, while the remote station software is defined as REMS.BAS and set forth at lines 10–5010.

The first section of the Initialization subroutine (lines 310–470) REMS.BAS closes all files, and initializes the user table, and the input buffers.

Referring to FIG. 7, the user table is an integer array of eight nineteen byte columns which is the maximum number of participants used in the preferred embodiment of the present invention, that is seven remote and/or relay stations and base station 20. Each nineteen byte column defines base station 20, a remote station 22 or a relay station 23 and contains a station address and other information used to set up and maintain data links. The user table of FIG. 7 is defined in both the base station 20 software and the software of each remote station 22 or relay station 23 though minor differences exist in table usage. It should be understood that the user table can be expanded to include more than eight remote and relay stations 23.

The structure of one column of the user table is shown in FIG. 7. The following discussion will be with reference to base station 22 software. Bytes five through ten, FIG. 7, contain the ASCII representation of the six character alphanumeric address of one remote station 22 or relay station 23. Bytes eleven through eighteen contain index numbers which reference other columns in the user table which, in turn, contain the addresses of relay stations 23 when relay stations 23 are utilized by multiple unit tracking system 18. Byte four is the byte number of the last relay station 23 index plus one. If byte four is zero, relay stations 23 are not used in the data link with the remote station. Byte zero contains the address of the output buffer holding a message to be sent to the remote station 22 identified by bytes 5–10. Byte one contains a number ten times the reporting period of the remote station 22. Bit zero of byte two identifies the participant as a reporting remote station, while bit one of byte two identifies the participant as a repeater/relay station 23 which may be either a stand alone relay station 23 or a remote station. Byte three is a retry counter and is used to identify nonresponsive participants.

FIG. 8 depicts an example setup of the contents of the user table for the base station software following completion of the Initialization subroutine. In the example of FIG. 8, base station 20 (PLP001, column 0, Bytes 5–10) sets up data communication links with three remote stations 22. The first link to a remote station PLP002 (column 1, Bytes 5–10) is a direct link without relay stations 23. The second link to a remote station PLP003 (column 2, Bytes 5–10) is through a stand alone relay station PLP005 (column 3, Bytes 5–10). The third link to remote station PLP004 (column 4, Bytes 5–10) is through both the stand alone relay station PLP005 and station PLP003. In this example, station PLP003 acts as both a reporting remote station and a relay station. Column zero of FIG. 8 is reserved for "own site" address and so contains the address of the base station (PLP001). Column one of FIG. 8 is set up for the PLP002 remote station. As bit zero of byte two is set to a logic "1", the remote station PLP002 is a reporting remote station. Byte four is zero indicating that no relay stations 23 are being used in this link.

Column two of FIG. 8 is set up for station PLP003. As byte two is a "3", bit zero and bit one are "ones", this station is used as both a reporting remote station and a relay station. Byte four is greater than zero indicating that relaying is used in this link. Byte eleven contains the index to the first relay station 23, in this case "3", therefore, column three holds the address of the relay station PLP005. Byte four of column two, FIG. 8, is "12". Since this is already one more than the location of the first index (byte eleven), only one relay station 23 is used in this link.

Column three of FIG. 8 contains the address of the stand alone relay station PLP005. Byte two is set to "2", bit one is "1", indicating that this site is a relay station only. Column four of FIG. 8 is set up for station PLP004. Byte two, bit zero, is one indicating that this is a reporting remote station. Byte four is greater than zero indicating that relaying is used in this link. Byte eleven of column 4 contains the index of the first relay station, in this case "3", therefore, the site reference in column three, relay station PLP005 will be used as the first relay. Byte twelve of column 4 contains the index of the second relay station in this case "2", therefore the site reference in column two, station PLP003 will be used as the second relay in this link. This is one more than the location of the second relay index (byte twelve), so only two relays are used in this link.

In the remote station software, the user table is also defined. Bytes four through eighteen of FIG. 7 serve the same purpose as in the base station software. Bytes zero, one and three of each column of FIG. 7 are not used in the remote station software and byte two serves a different purpose than in the base station software. When a remote station receives its first message from the base station, it must fill out its user table with any site addresses which were used to relay the message. This need only be done once, so byte two is used as a flag to indicate the relay address have been included in the remote station's user table.

FIG. 9 shows the user table of remote station PLP004 as it would look following receipt of the first message from the base station PLP001 in the previous example. Column zero of FIG. 9 is reserved for "own site" address information (PLP004). Column one of FIG. 9 is reserved for the base station address (PLP001) Byte four of column one is set to thirteen indicating that bytes eleven and twelve contain indexes to relay stations. Byte eleven of column one is "2", thus the first relay address is located in column two, bytes 5-10 (PLP003). Byte twelve of column one is "3", thus the second relay address is located in column three, bytes 5-10 (PLP005). It should be noted that the message to remote station PLP004 was transmitted from the base station, relayed through PLP005 and then relayed through PLP003, whereas any reply from remote station will be relayed in reverse order.

Data input from terminal node controller 34 at each remote station 22 or terminal node controller 38 at base station 20 to the computer software is accomplished through a set of input buffers in computer memory. Each input buffer of which there are eight for each computer in system 18 is 128 bytes long. The first byte of each buffer indicates the number of bytes that have been loaded into the buffer. If this byte is zero, the buffer is empty. During the software initialization routines for the base station and remote stations, the input buffers are cleared and the head and tail pointers are set to zero.

When the first message arrives from terminal node controller 32 or 38, the computer software selects the buffer indicated by a head pointer which is buffer "0" and loads the data. When the last byte of the message is loaded into buffer "0", the head pointer is incremented to one to direct the software to load the next message into buffer "1". A tail pointer which is still set to zero, thus being unequal to the head pointer, indicates that a buffer is full and ready for processing. When a processing subroutine of the computer software is called, the subroutine acts on the buffer indicated by the tail pointer, in this case buffer "0". Once buffer "0" has been processed, the first byte of the buffer is set to zero declaring buffer "0" empty, and the tail pointer is incremented. As the head and tail pointers are now both equal to one, no more buffers are ready to be processed.

The procedure of filling and processing input buffers continues as described above except when the seventh buffer is loaded or processed. In this case the head or tail pointer is not incremented to "8" but reset to "0". This creates the effect of a circle of buffers numbered zero through seven with the head pointer rotating as buffers are loaded and the tail pointer following the head pointer as buffers are processed and cleared.

The next section of the Initialization subroutine (lines 490-540) of REMS.BAS partially describes an array of constants which will be filled in by data from bas station 20 and loaded into the terminal node controller 38 of each remote station 22 to modify Slottime and Persistence timing parameters.

The next section (lines 560-660) of REMS.BAS initializes output buffers and sets certain flags and counters.

Output of messages, either information frames or status frames, from the computer software either at base station 20 or each remote station 22 to terminal node controller 32 or 38 is accomplished through a set of output buffers in computer memory. Unlike input buffers, processing of messages may require that an output buffer already loaded be cleared prior to use. This necessitates the use of a linked-list buffer scheme or buffer list for output buffers which is illustrated in FIG. 10.

The linked-list configuration as used in multiple unit tracking system 18, utilizes head and tail pointers to identify the first generated/oldest and last generated/newest output buffers in the link-list buffer scheme. In addition, forward and backward pointers associated with each buffer are used to identify the buffer immediately ahead and the buffer immediately behind a particular buffer. Each output buffer of which there are sixteen for each computer in system 18 is 128 bytes long. The first byte of each output buffer indicates the number of bytes that have been loaded into the buffer. If this byte is zero, the output buffer is empty. The second byte of each buffer is the forward pointer, which identifies the next oldest buffer. If the second byte is zero, the buffer is the first on the buffer list. If the second byte is set at a "−1" the buffer is not on the buffer list. The third byte of each buffer is the backward pointer, which identifies the next newest buffer. If this byte is zero, the buffer is the last buffer on the buffer list. During the software initialization routines for computers 22 and 40, the output buffers are cleared, the head and tail pointers are set to zero, and the forward pointers are set to "−1".

FIG. 10(A)-(D) is an example illustrating the status of head and tail pointers and forward and backward pointers as the pointers are being utilized. In this example, FIG. 10(A), four buffers numbered "1" through "4" are filled in order. The head pointer is set to "1" indicating that buffer one is the first buffer in the buffer list. The backward pointer in buffer one is set to "2" indicating that buffer two is the next buffer in the buffer list. Following the backward pointers of each successive buffer will lead to the buffer identified by the tail pointer which is buffer four. The forward pointer in buffer four is set to "3" indicating that buffer three is the previous buffer in the buffer list. Following the forward pointers of each successive buffer will lead to the buffer identified by the head pointer which is buffer one.

Figure 10D:
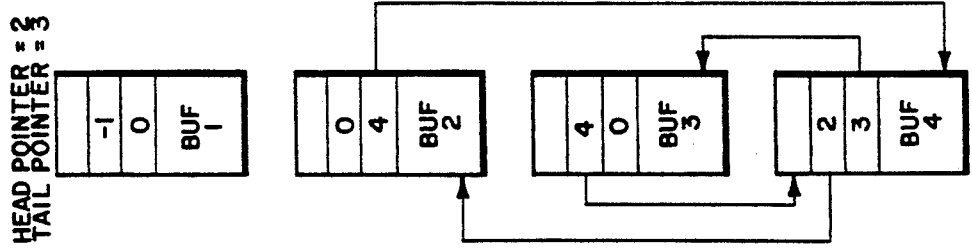
FIG. 10(A)-10(D) is an example illustrating the use of the output buffers for the computers at the base and remote stations of the present invention.
Figure 10C:
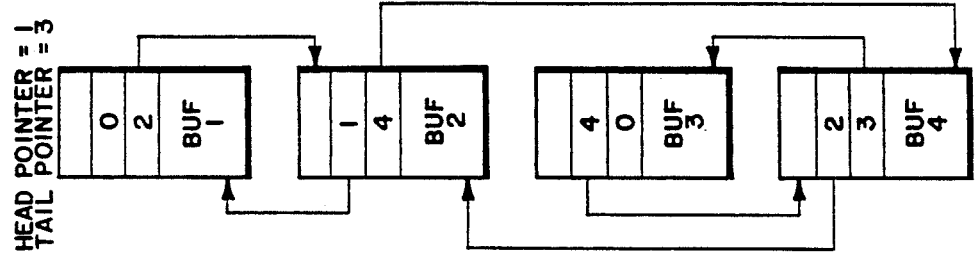
Figure 10B:
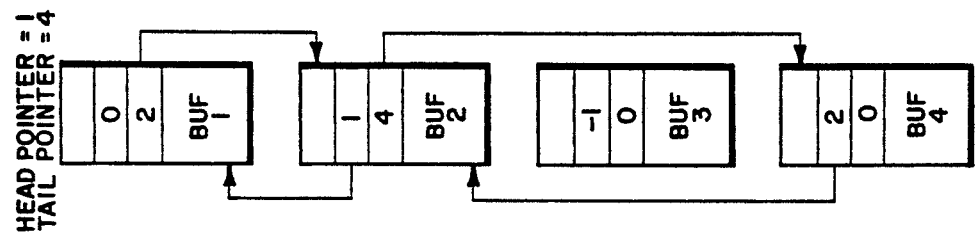
Figure 10A:
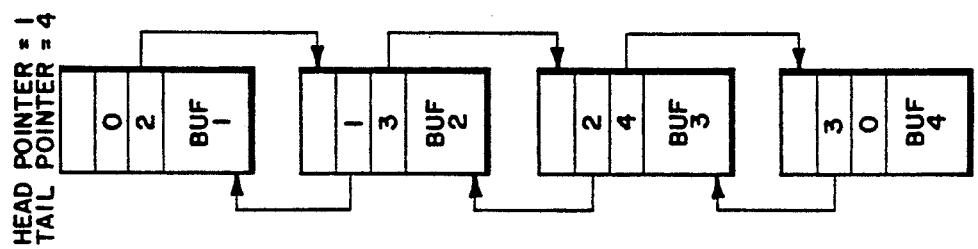

If a processing of information by computer 40 for example requires the removal of buffer three from the buffer list, the pointers would appear as shown in FIG. 10(B). The head and tail pointers would remain the same as in FIG. 10(A), but buffer three is no longer linked in the buffer list. The backward pointer in buffer two now points to buffer four, and the forward pointer in buffer four now points to buffer two. The forward pointer of buffer three is set to a "−1" indicating that this buffer is not currently linked.

Should a second message be generated for output by computer 40, the data would be loaded into buffer three and buffer three would be linked to the end of the list. The buffer pointers would then appear as in FIG. 10(C). The head pointer remains the same indicating-buffer one, but the tail pointer is changed to reflect the new end of the buffer list which is buffer three. The backward pointer in buffer four now points to buffer three and the forward pointer in buffer three points to buffer four. The backward pointer in buffer three is set to zero to indicate that this is the last buffer in the buffer list.

When the "Print Output Buffer" subroutine (lines 5210–5420, BATS2.BAS and lines 3780–3960, REMS.BAS) is called, it processes the output buffer referenced by the head pointer which is buffer one. Once buffer one is output to the terminal node controller 32 or 38, the buffer is cleared and unlinked from the buffer list. The pointers would then appear as shown in FIG. 10(D). The head pointer is changed to indicate the next buffer in the list is buffer two, the forward pointer of buffer one is set to "−1" to indicate that the buffer is not linked to the buffer list and the forward pointer of buffer two is set to zero to indicate that this is the first buffer in the buffer list.

Referring to the REMS.BAS program listing, lines 680–800 of the REMS.BAS software program at each remote station 22 load the address of the remote station 22 (lines 680–730) and the base station 20 (lines 750–800) into the user table of FIG. 7.

The last section (lines 680–900) of the initialization routine of the REMS.BAS program sets up the input buffer for Loran-C receiver 30 at remote station 22 and opens the communications channel with terminal node controller 32. Due to the operational characteristics of the Loran-C receiver 30 used in the multiple unit tracking system 18, the communications channel to receiver 30 is not opened at this time.

The software at each remote station 22 then enters the Main Program Loop (lines 180–240) of the REMS.BAS program where checks are made for data from terminal node controller 32 at remote station 22, the status of the input and output buffers of the RAMS.BAS software in computer 28 and the status of the Loran-C 30. If any checks are true, that is if the input buffers, output buffers, Loran-C 30 or terminal node controller are ready to provide data, the appropriate subroutine is called. The loop also calls the Check Timers subroutine at lines 4540–4700 of the REMS.BAS program. At this time in the REMS.BAS program, all checks are false and the program will remain in the main loop until a command is received from base station 20.

When loaded and started the BAST2.BAS computer program on computer 35 at base station 30 jumps to the Initialization subroutine (lines 340–2500). The Initialization Subroutine first defines a set of error messages which will be displayed should the operator make an error in system setup (lines 340–410). The BAST2.BAS software then defines two arrays which contain information for the computer graphics to draw up to eight markers to indicate remote station 22 and/or relay station 23 positions [430–660]. The software then sets up an array used to initialize terminal node controller 38 (lines 680–750) which is a Kantronics Model KPC-2 terminal node controller. The BAST2.BAS computer software program next loads map data for the map of FIG. 4 from a disk 41 (lines 4360–4410); defines the eccentricity and semi-major axis of the geodetic spheroid used in reducing Latitude and Longitude positional data; and scale factors and offset values for the map data (lines 840–900).

Processing Loran-C 30 longitude and latitude positional data and displaying position and map data on computer screen 14 requires the use of four different coordinate systems. Latitude and Longitude Geodetic coordinates are provided by the Loran-C receiver 30 at each remote station 22. These Geodetic coordinates are converted in the base station software into East-North-Up Tangent Plane or Topocentric Cartesian coordinates for overlaying onto the range map of FIG. 4. The Range Map data is generated by a "bit-pad" with its own two dimensional coordinate system. For display, all map and position data are transformed into a computer screen coordinate system.

The world geodetic system was developed to provide a geocentric reference system to which different geodetic datums can be transformed to satisfy mapping and geodetic requirements. An equipotential ellipsoid of revolution, which is in the shape of a spheroid, is taken as the reference surface or geometric figure of the earth. The particular reference ellipsoid used in multiple unit tracking system 18 is designated Department of Defense WGS-72. The ellipsoid, in turn, has a semi-major axis of 20925640 feet and an ellipsoid eccentricity of 0.08181881.

The Topocentric Cartesian Coordinates System is located at any reference point desired where the geodetic coordinates are known. In multiple unit tracking system 18, the range origin selected was site 004008, Building. 53 at the Pacific Missile Test Center, Pt. Mugu, Cal. The xy plane is tangent to the ellipsoid, while the z axis is normal to the ellipsoid and directed upward. The positive axis is directed at an alpha angle from true North. The alpha angle is measured clockwise from true North and is set at ninety degrees. The positive y axis is ninety degrees counterclockwise from the positive x axis. The coordinate system is right handed. When the alpha angle is ninety degrees, the +x axis points East and the +y axis points to true North.

Figure 11:
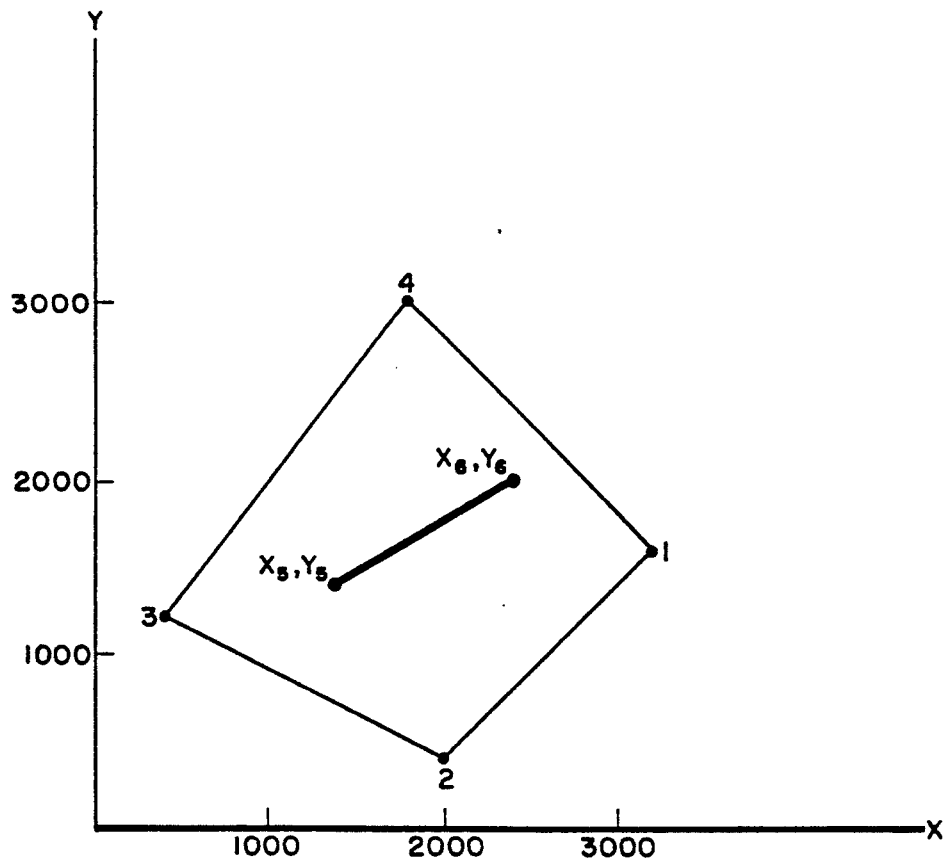
FIG. 11 illustrates the binary data file used to generate the map of FIG. 4.

Referring to FIG. 11, the map data file for the map of FIG. 4 was generated by placing a printed map of the range on a "bit-pad" and manually designating points and line segments which when drawn on the computer screen 24 represent coastline and range area boundaries. For multiple unit tracking system 18, the range area digitized was approximately 120 nautical miles square. With a bit-pad range of 6000 points in the X and Y coordinates, each point converts to 119.683 feet. The X and Y values of the digitized points for the map of FIG. 4 are stored in a disc file 41 for use in computer 40. As is best illustrated by FIG. 11, a flag in bit 14 of the X coordinate indicates whether a particular set of coordinates represents a point or the endpoint of a line segment. For example, for the $X_1$ coordinate bit 14 is set at one thereby indicating the coordinates $X_1$, $Y_1$ form a point designated as point 1. Since bit 14 of $X_2$ is set at zero the coordinates $X_2$, $Y_2$ indicate a line drawn from coordinates $X_1$, $Y_1$. It should be noted that the coordinates for the range origin of FIG. 4 are X=3571 and Y=4397.

Additionally, a number pair is stored to indicate the color of subsequent line segments. For example, bit 13 of the $X_0$ coordinate is set to one and a number five which indicates the selected color is inserted in place of an X coordinate. The disk file containing map data is loaded into the base station computer 40 during the initialization routine.

The Latitude and Longitude Geodetic coordinates from the Loran-C receiver 30 after being received by base station 20 are first converted to geocentric coordinates XG, YG, and ZG by the following equations:

$$XG = (N+H)\cos\phi\cos\lambda \qquad \text{Eq. 1}$$

$$YG = (N+H)\cos\phi\sin\lambda \qquad \text{Eq. 2}$$

$$ZG = [N(1-e^2)+H]\sin\phi \qquad \text{Eq. 3}$$

where:

$$N = \frac{a}{\sqrt{1-(e^2\sin^2\phi)}}$$

a = ellipsoid semi-major axis (WGS-72 = 20925640 feet)
e = ellipsoid eccentricity (WGS-72 = 0.08181881)
$\lambda$ = Longitude
$\phi$ = Latitude
H = geodetic height (assumed zero in prototype system)

The geocentric coordinates are then converted to offset geocentric coordinates by subtracting the geocentric coordinates of the Range Origin which are X = −8440322 ft, Y = −15150850 ft and Z = 11669280 ft (site 004008, Bldg. 53 at the Pacific Missile Test Center, Pt. Mugu, Cal.):

$$XO = XG - (-8440322) \qquad \text{Eq. 4}$$

$$YO = YG - (-15150850) \qquad \text{Eq. 5}$$

$$ZO = ZG - (11669280) \qquad \text{Eq. 6}$$

The offset geocentric coordinates are then converted into tangent plane coordinates XT, YT, and ZT by multiplication of a rotational matrix:

$$\begin{vmatrix} A & B & C \\ D & E & F \\ G & H & I \end{vmatrix} \begin{vmatrix} XO \\ YO \\ ZO \end{vmatrix} = \begin{matrix} XT\,(\text{East}) \\ YT\,(\text{North}) \\ ZT\,(\text{Up}) \end{matrix}$$

The elements of the rotational matrix are defined as follows:
$A = -\sin\lambda\sin\alpha - \cos\alpha\cos\lambda\sin\phi$
$B = \cos\lambda\sin\alpha - \cos\alpha\sin\lambda\sin\phi$
$C = \cos\phi\cos\alpha$
$D = \sin\lambda\cos\alpha - \sin\alpha\cos\lambda\sin\phi$
$E = -\cos\lambda\cos\alpha - \sin\alpha\sin\lambda\sin\phi$
$F = \cos\phi\sin\alpha$
$G = \cos\lambda\cos\phi$
$H = \sin\lambda\cos\phi$
$I = \sin\phi$ For $\alpha = 90$ degrees, $\lambda = -119.1214044$ degrees (site 004008 Longitude) and $\phi = 34.1129172$ degrees (site 004008 Latitude):
$A = -\sin\lambda = 0.8735892$
$B = \cos\lambda = -0.4866641$
$C = 0$
$D = -\cos\lambda\sin\phi = 0.2729335$
$E = -\sin\lambda\sin\phi = 0.4899308$
$F = \cos\phi = 0.8279308$
$G = \cos\lambda\cos\phi = -0.4029259$
$H = \sin\lambda\cos\phi = -0.7232745$
$I = \sin\phi = 0.5608253$ This results in the following equations for calculating XT and YT since ZT is not used in system 18.

$$XT = 0.8735892 \cdot XO + (-0.4866641) \cdot YO \qquad \text{Eq. 7}$$

$$YT = 0.2729335 \cdot XO + 0.4899308 \cdot YO + 0.8279308 \cdot ZO \qquad \text{Eq. 8}$$

The XT and YT coordinates are then divided by 119.683 feet to make the XT and YT coordinates the same scale as the map data points.

The computer screen in graphics mode is resolved into 640 horizontal and 350 vertical lines. The map area of the screen is limited to horizontal lines 128 through 640. To plot the map on the screen, each set of coordinates read from the map file are first normalized by subtracting the "bit-pad" coordinates of the Range Origin (X=3571, Y=4397). The coordinates are then multiplied by X and Y scale factors. The scale factors (initialized at 0.08276 and 0.05985) respectively convert the map points to computer screen coordinates. In addition, X and Y offset values are added to the coordinates to center the map on the screen. The initial values of the scale factors and offset values will place the entire 120 nautical mile square range map onto the computer screen 24. The operator can change the scale factors during operation for the effect of "zooming" in or out on the range map of FIG. 4. The operator can also change the offset values for the effect of map "panning".

Position information from the remote station which has been converted as described above is multiplied by the same scale factors and adjusted by the offset values for overlaying the position marker over the map display.

The next section of the Initialization subroutine (lines 920-1060) of BAST2.BAS sets up the input buffers, the user table of FIG. 7 for base station 20 and a timer array which identifies time-out conditions with the remote stations. The next section of the Initialization subroutine (lines 1080-1150) of BAST2.BAS initializes the output buffers which are illustrated in FIG. 10. The address of base station 20 is loaded into the user table of FIG. 7 at lines 1170-1220 of the BAST2.BAS computer program. It should be noted that FIG. 8 is an example of the user table for base station 20. The remainder of the Initialization subroutine (lines 1240-2400) instructs the system operator to load the user table with remote station specific data as is best illustrated in FIGS. 7 and 8. Multiple unit tracking system 18, as currently configured, can accommodate up to seven reporting stations and/or relay stations 23 each identified by a unique six character alpha-numeric call sign.

After returning from the Initialization subroutine, the BATS2.BAS computer software then jumps to the Establish Links Subroutine (lines 2570-3030). The purpose of this subroutine is to send a request for status message to all of the remote stations identified in the Initialization subroutine and to wait until all stations have responded or have timed out. If all stations respond, the BATS2.BAS computer program continues. If one or more remote or relay stations 23 do not respond, the operator is given the option to continue the BATS2.BAS computer program, send another request for status message to all of the remote and/or relay stations 23 identified in the Initialization subroutine, or abort the program.

The Establish Links Subroutine first counts the number of remote stations entered by the operator (lines 2650-2730). For each participant in the user table of FIG. 7 which is identified as a reporting station, a status request message is generated and added to the output buffer list of computer 40 (lines 2650-2730). Included in this status request message is a timing parameter which includes the PERSISTENCE and SLOTTIME values and which is based on the number of remote stations and relay stations 23 in multiple unit tracking system 18. This timing parameter, which maximizes channel throughput, is loaded into the terminal node controller 32 at each remote station and relay station 23. The status request message is built by calling a Send Request for Status subroutine (lines 4230-4400) of the BAST2.BAS program. This subroutine calls the Find Output Buffer and Pack Address subroutine (lines 4460-4810) which locates an empty output buffer and loads the output buffer from the user table of FIG. 7 with the source address which is base station 20, the destination address of the remote station, the relay addresses if used, and various status bits as required by AX.25 protocol. After returning to the Send Request for Status subroutine (lines 4230-4400), the BAST2.BAS software appends to the buffer a pair of control bytes (the control field and the protocol identifier field), the message type number and the aforenoted timing parameter (lines 4260-4380). The Send Request for Status subroutine then calls or goes to the Link Output Buffer subroutine (lines 4880-4980) which links the filled output buffer onto the end of the output buffer list.

The BAST2.BAS software returns to the Establish Links subroutine and enters a status loop (lines 2760-2820) where control will remain until all remote stations have returned a status message or have timed out. The first line in the status loop checks for any input from terminal node controller 40. At this point in time, all remote stations 22 should be in the quiescent state so this check will be false. The next check is for input buffers full. Since data has not been transmitted from the remote stations 22 to the base station 20 there will be no input buffer full at this time and the check is false. The next check is for an output buffer full. Since output buffers have been loaded with request for status messages and linked to the output buffer list this check is true which results in the Print Output Buffer subroutine being called.

The Print Output Buffer subroutine (lines 5210-5420) takes the first buffer of the output buffer list, FIG. 10, as indicated by the output buffer head pointer and sends the data in this buffer to the Terminal node controller 38 for transmission. The output buffer is then taken off the buffer list and a check is made to determine if an acknowledge message was requested from the remote station. If an acknowledge message was requested, as in the case of a request for status message, a timer is set equal to twice the response time for the remote station. The first output buffer of the output buffer list is saved and if the timer expires before an acknowledgement is received by base station 22 as determined by the check timers subroutine (lines 6890-7040) of the BAST BAS program, the output buffer is once again linked to the output buffer list for retransmission to the remote station. If no acknowledge message was requested by base station 22, then the output buffer that was sent is cleared.

Referring to the status loop of the Establish Links subroutine (lines 2760-2820), the check timers subroutine is called at line 2790 of the BAST2.BAS program. This subroutine (lines 6890-7160) checks two timers associated with each remote station 22. The first timer is the remote station activity timer. This timer is not enabled until a remote station has begun transmitting longitude and latitude position reports. The timer is set up to a value of five times the reporting period for the remote station and is reset to this value whenever a message is received from the addressed remote station 22. If no messages are received causing the timer to decrement to zero, the operator is informed of a time out condition for the remote station, and an initiate message is periodically sent to the remote station automatically to reactivate the station.

The second timer associated with each remote station 22 is the acknowledge timer that is set in the print output buffer subroutine (lines 5210-5420). This timer is set if a message was sent to a remote station that required an acknowledge. The timer is cleared if an acknowledge is received from the addressed remote station. If the acknowledge timer expires, that is no acknowledge message is received from the remote station, then the output buffer that contained the message to the remote station is linked onto the output buffer list for retransmission. This cycle will occur five times before multiple unit tracking system 18 declares the remote station unresponsive. This, in turn, is the function of the retry counter of the base station user table of FIG. 7.

Referring again to the status loop of the Establish Links subroutine (lines 2760-2820), each remote station in the user table of FIG. 7 is checked to see if a response has been received or the remote station has been declared unresponsive. If neither of these conditions are true for any remote station 22, the status loop restarts at the check for terminal node controller 38 input.

Referring to REMS.BAS remote station software, the software at each remote station 22 has been cycling through the Main Loop waiting for a command from base station 22. The first check in the main loop is for input data from base station 22 which is provided from terminal node controller 32. Once a message from base station 22 is received by terminal node controller 32, the message is passed to computer 28 and this check will be true. The Main Loop at line 180 of REMS.BAS calls Holding Buffer Input subroutine (lines 960-1320) which loads one byte at a time into an input buffer within computer 28. The Holding Buffer Input subroutine first checks to see if the byte from terminal node controller 32 is the beginning of a new message from base station 20 or the next byte in a message already being provided by base station 20 and currently being reconstructed by REMS.BAS software.

If the byte from terminal node controller 32 is the first byte of a new message from base station 20, the next input buffer is flagged open and a check is made for the proper message header byte. If, however, an input buffer is open and the byte is a continuation of the current message, the byte is added onto the end of the buffer and a check is made to see if this is the last byte in the message. If the check is true, that is the byte is the last byte of the current message, the buffer is closed and the head pointer is adjusted. If the check is false, that is the byte is not the last byte of the current message, control is transferred back to the main loop.

When a complete message is received from base station 20, the check for input buffer full in the main loop of the REMS.BAS computer software program will be true and the Process Input Buffer subroutine (lines 1370–1510) is called. The first section of the Process Input Buffer subroutine (lines 1370–1510) checks the address fields of the message. If the destination address in the message does not match the remote station's address, the software jumps to check the relay addresses for a match (lines 1700–1930). If the remote station is identified as a relay station 23 for the message, REMS.BAS transfers the message to an output buffer and links the output buffer onto the output buffer list for transmission.

Referring again to the first section of the Process Input Buffer routine, if the destination address is the same as the remote station address, then the source address is checked to see if the source address matches the address for base station 20. A check is next made to see if this message was intended to be provided to the remote station through a relay station 23. If the message is provided from base station 20 to the remote station without the use of relay stations 23, the message is processed by computer 28. If relay stations 23 are used to transmit the message from base station 20 to the remote station 22, and relaying is complete, the relay addresses are stored in the user table of FIG. 9 (lines 1530–1680) so that return messages are relayed back in reverse order of the command messages from base station 20. The message is then processed by computer 28.

If the checks of the message address field indicate that this message is intended for the addressed remote station, the data in the message is decoded by the REMS.BAS (lines 1960–2260) to determine the nature of the message. For example, if the message is an acknowledge requested by the remote station from base station 20, then the counter that would reset the remote station to a quiescent state after twenty unanswered reports is reset. If the message is a request for status from base station 20, then the array of constants described in the Initialization subroutine (lines 490–540) of REMS.BAS computer program at each remote station 22 is filled in by data (Slottime and Persistence) from base station 20 and loaded into terminal node controller 38 to modify timing parameters. If the message is an initiate report mode command, then the appropriate flags are set in the REMS.BAS computer software to dictate that the software is in a report mode and an acknowledge is transmitted to base station 20. If the message is a terminate command, a response is transmitted to the base station 20 and remote station reinitializes to the quiescent state.

Referring again to the Process Input Buffer routine, when the message from base station 20 is a request for status the REMS.BAS software at the remote station 22 will initialize terminal node controller 32 and call the Send Response subroutine (lines 2320–2420). The Send Response subroutine, in turn, calls the Find Output Buffer and Pack Address subroutine (lines 3030–3380) which locates an empty output buffer and loads the output buffer from the user table of FIG. 9 with the source address, the destination address of base station 20, the relay station addresses if used, and various status bits as required by the AX.25 protocol. After returning to the Send Response subroutine, the REMS.BAS software appends the control field to 11 hexadecimal or 15 hexadecimal. The Send Response subroutine next calls the Link Output Buffer subroutine (lines 3450–3530) which links the filled output buffer onto the end of the output buffer list, FIG. 10. After processing the input buffer, the REMS.BAS software clears the input buffer, adjusts the input tail pointer, and returns to the main loop of the program.

After the response message has been linked, the output buffer full check in the main loop will be true and the Print Output Buffer subroutine will be called. The Print Output Buffer subroutine (lines 3780–3960) takes the first buffer off the output buffer list as indicated by the output buffer head pointer and sends the data in this buffer to terminal node controller 32 for transmission to base station 20. The output buffer is then cleared and taken off the buffer list.

Referring now to BAST2.BAS program at base station 20, the software is operating in the status loop of the Establish Links subroutine (lines 2570–3030). As the responses from the remote stations 22 are received by terminal node controller 38 at base station 20, data is passed to the base station computer 40 and the check in the status loop for input data available will be true. At this time the Holding Buffer Input subroutine (lines 3250–3580) will be called to load one byte at a time into an input buffer. The Holding Buffer Input subroutine (lines 3250–3580) first checks to see if the next byte from terminal node controller 38 is the beginning of a new message or the next byte in a message already provided by one of the remote stations 22 and currently being reconstructed by the BAST2.BAS software. If the byte from terminal node controller 38 is the first byte of a new message from one of the remote stations 22, the next input buffer is flagged open and a check is made for the proper message header byte. If, however, an input buffer is open and the byte is a continuation of the current message, the byte is added onto the end of the buffer and a check is made to see if this is the last byte in the message. If the check is true, that is the byte is the last byte of the current message, the buffer is closed and the head pointer is adjusted. If the check is false, that is the byte is not the last byte of the current message, control is transferred to the status loop of the Establish Links subroutine (lines 2570–3030).

When a complete message has been received at base station 20, the status loop check for input buffer full will be true and the Process Input Buffer subroutine (lines 3630–4040) will be called. The first section of the Process Input Buffer subroutine (lines 3630–3810) checks the address fields of the message. In order for the message to be processed, the destination addresses in the message must match the address of base station 20, relaying must be complete if the message was intended to be received through a relay station 23 or more than one relay station 23, and the message source address must match one of the remote station 22 addresses in the user table of FIG. 8. If any of these checks fail, that is one of the checks is false, the message is discarded. If all the checks of the message address are true, the data in the message is decoded/processed at lines 3820–4040 of the Process Input Buffer subroutine.

If, for example, the message is a response from one of the remote stations 22 to a request by base station 20, then the validity of the response is checked at lines 3920–3950 of the BAST2.BAS program. If valid, then the output buffer that contained the request is cleared, and the response timer for that remote station 22 is disabled by the Unlink and Clear Buffer subroutine [5040–5150]. If the message were a position report from one of the remote stations 22, then the position report would be processed by computer 40 and if an acknowledge was requested by the remote station 22, an acknowledge would be sent by the BAST2.BAS computer program at lines 3850-3960. Following all processing of the message, the input buffer is cleared, the tail pointer is adjusted, and the remote station activity timer, if enabled, is reset at lines 4000-4040 the BAST2-.BAS program. The software will return to the status loop in the Establish Links subroutine (lines 2570-3030) and remain there until all remote stations 22 have responded or have been flagged as unresponsive.

After exiting the status loop of BAST2.BAS, the operator of multiple unit tracking system 18 is informed of the status of the remote station links. If all remote station links are established, the program continues. If all remote station links are not established, the operator is given a choice of either continuing with those remote stations that responded, or to restart the Establish Links subroutine. If all links are established or the operator chooses to continue, the BAST2.BAS program calls the Initiate Report Mode subroutine. The Initiate Report Mode subroutine (lines 3100-3190) enables the remote station activity timer for all remote stations 22 and sends an initiate report mode message to each station 22 which includes the frequency at which the remote station should report its position to base station 20. The initiate report mode message is sent in the same manner and using the same subroutines as the request for status message that was sent to each remote station in the establish links subroutine. The Initiate Report Mode subroutine also opens a disk file that will save the remote station position report data when received for post operation analysis. The BAST2.BAT software now enters the Main Loop (lines 220-280) of the program. The main loop contains checks for keyboard entry, input data available from terminal node controller 38, input buffer full, and output buffer full. The Main Loop of the BAST2.BAT software are also calls to the check timers subroutine and the draw map line subroutine (lines 6470-6830).

The software utilized to write the BAST2.BAT and REMS.BAS program instructions for multiple unit tracking system 18 is conventional GW-Basic. The graphics limitations of GW-BASIC compiler used to generate the base station software presented two problems which are handled by the BATS2.BAS software. First, as the position markers for remote stations 22 move across the range map of FIG. 4 on monitor 24, the position markers will erase the part of the map the markers cross. To solve this problem the range map of FIG. 4 is continually redrawn by the BATS2.BAS software. The second problem arises due to reserving the left one quarter of the display screen for alpha-numeric data including remote station position coordinates and time-out messages. A "clipping" algorithm to prohibit drawing the map in the reserved area had to be implemented in the base station software.

The Draw Map Line subroutine (lines 6470-6670) is called on every pass through the main loop of the BATS2.BAT program in which input data from terminal node controller 38 is not available to computer 40. This routine will either plot a map point, draw a map line, change the color of the map lines to be drawn, or plot a circle on the map corresponding to the location of the range origin (site 004008, Bldg. 53 at the Pacific Missile Test Center, Pt. Mugu, Cal.). Which action is taken is dictated by the contents of the map array already loaded and the equations 1 thru 8 discussed previously. Points from the map array are normalized and scale and offset factors ar applied to generate display coordinates for the map of FIG. 4. If a map line is to be drawn, the clipping algorithm is called (lines 6700-6830). If both endpoints of the line fall within the right three-quarters of display screen 24 (map area of FIG. 4), the line is drawn without modification. If both endpoints of the line fall outside the map area, no draw commands are generated. If one endpoint of the line lies inside the map area and one point of the line lies outside the map area, a point is calculated which lies on the intersection of the map area boundary and the line if it were drawn. This point and the endpoint of the line which fell inside the map area are the new endpoints of the line.

The operator at base station 20 can effect changes in the map being viewed on display screen 24 by using keyboard 35. If the operator hits a key on keyboard 35, the keyboard entry check (line 230) in the main loop is true, then the Process Keyboard Entry subroutine (lines 5480-5780) is called. This routine (lines 5480-5780) inputs the keyboard character and performs one of the following: If a "1" is entered by the operator, the X and Y scale factors are modified to effect a zoom in on the map display appearing on monitor 24. If a "2" is entered by the operator, the X and Y scale factors are modified to effect a zoom out on the map display appearing on monitor 24. An entry of "3" or "4" by the operator modifies the X offset to effect a pan of the map display appearing on monitor 24 right or left, respectively. An entry of "5" or "6" by the operator modifies the X offset to effect a pan of the map display appearing on monitor 24 up or down, respectively. An entry of "0" or any non-numeric key via keyboard 35 will reset the map scale and offset to the initialized values. An entry of "9" by the operator will cause the termination of system operation.

The Initiate Report Mode messages that were linked to the output buffer by the Initiate Report Mode subroutine (lines 3100-3190) will be output to terminal node controller 38 from the main loop of BAST2.BAS by calling the Print Output Buffer subroutine (lines 5210-5420).

Referring to the REMS.BAS computer program, the software is cycling through the main loop waiting for a message from the base station 20. At this time, the software will receive the initiate report mode message that was sent by base station 20. This message is input and processed as described above.

Due to the operational characteristics of the Loran-C receiver 30 and Zenith 150 personal computer 28 used in multiple unit tracking system 18, the method of obtaining the position of each remote station 22 is complicated. The receiver continuously sends data packets at a fixed rate, thus providing more latitude and longitude position data then can be processed by computer 28. To resolve this problem, the data channel from computer 28 to receiver 30 is only opened when a position report is required by the REMS.BAS computer software and closed as soon as the position information is transferred to computer 28. Channel two of computer 28, which is used for data from Loran-C receiver 30 data, periodically quits functioning when both channel one and two serial interfaces of computer 28 are being used. To handle this situation, an interface time-out timer for channel two of computer 28 was added to the REMS.BAS software to identify and clear the channel problem.

When the initiate report mode message is received by the remote station 22, the time which identifies the frequency of reporting is saved and used to initialize the report timer for the remote station. At line 210 the main loop of the REMS.BAS program calls the Check Timers subroutine (lines 4540–4700) checks the report timer for the remote station and if the report timer has expired, that is the time to send a position report has expired, the channel to Loran-C receiver 30 is opened and a channel time-out timer is set. On subsequent passes through the Check Timers subroutine, the time-out timer is checked. If the channel time-out timer has expired because channel two quits functioning, channel two is cleared, reopened, and the time-out timer is reset. Once the channel to the Loran-C receiver 30 is opened, the main loop checks for input positional data from receiver 30. If this check is true, the LORAN Input subroutine is called.

The first section of the LORAN Input subroutine (lines 4020–4130) identifies and loads either of two data blocks from Loran-C receiver 30. The two data blocks used in multiple unit tracking system 18 are the Latitude/Longitude or "L" block and the SNR or "S" data block. The SNR data block provides an indication of the reliability of the position data being provided by Loran-C receiver 30. When a complete "L" data block is received, the data block is decoded and a flag is set (lines 4150–4280). When a complete "S" block is received from receiver 30, the three SNR values are decoded, the smallest of the three SNR values is stored, and another flag is set (lines 4300–4370). When both the "L" and "S" flags have been set, the Loran-C channel is closed and the Send Position subroutine is called (lines 4400–4480). The Send Position subroutine first resets the report timer for the remote station 22 and then calls the Find Output Buffer subroutine to locate an unused output buffer and pack the source, destination, and relay address's (lines 2490–2520) to allow for transmission of latitude and longitude positional data to base station 20. Control bytes are added to the buffer followed by the message type, the reformatted Latitude, Longitude, and SNR value (lines 2530–2920). The buffer is then linked to the output buffer list.

The remote station REMS.BAS software maintains a counter representing the number of position reports sent to base station 20. When the value of this counter is greater than nine, the position report includes a request for an acknowledge from base station 20. When an acknowledge is received from the base station 20, the counter is reset to zero. Should the counter ever reach a value of twenty, meaning the base station did not acknowledge position reports ten through nineteen, the remote station REMS.BAS software assumes the link with base station 20 has been disconnected and reinitializes to the quiescent state.

Referring to the base station BAST2.BAS software, the position report from each remote station 22 will be input by the Holding Buffer Input subroutine (lines 3250–3580) and decoded by the Process Input Buffer subroutine (lines 3630–4040) as previously described. When a position report is identified, the Process Position Data subroutine (lines 5850–6410) is called. The Process Position Data subroutine first decodes the Latitude and Longitude data and converts them to radian values in accordance with the following equation for further processing (lines 5850–5960).

$$\text{Radians} = \frac{\text{Degrees} \cdot \pi}{180} \quad \text{Eq. 9}$$

The latitude and longitude radian values, along with the SNR value and a time tag are then recorded onto a base station disk (lines 5980–6090). The next section of the routine (lines 6110–6210) uses the Latitude and Longitude data along with some geodetic data identified in the initialization routine to calculate the tangent plane coordinates of the remote station 22 using the aforenoted equations 1-8. The routine then applies the scale and offset values to convert the coordinates to display screen coordinates and plots the position of the remote site on the display screen 24. The tangent plane X and Y coordinates are printed on the left side of the screen.

The process of each remote station 22 sending position reports and base station 20 plotting positions on the map of FIG. 4 for viewing on screen 24 continues until such time as the operator terminates the links between base station 20 and remote stations 22 by entering a "9" from keyboard 35. When this entry is input by the Process Keyboard Entry subroutine, the Terminate subroutine is called. The Terminate subroutine (lines 7230–7450) of the BAST2.BAS program builds and links a terminate message to each remote station 22. A status loop is then entered which, like the status loop in the Establish Links subroutine, waits for all remote stations 22 to acknowledge the terminate message. When all remote stations 22 have responded or have been flagged unresponsive, the BAST2.BAS software program closes the disk file where data was recorded and ends the program.

Upon receiving a terminate message from base station 20, each remote station 22 sends an acknowledge message and reinitializes to the quiescent state.

```
10       ' BAST2.BAS
20       '
30       ' CONTROL PROGRAM FOR MULTIPLE UNIT TRACKING SYSTEM
40       '
50       '
60       DIM MAPZ(338,1),ADTZ(5),ERMS$(10),UD$(8)
70       DIM IHBZ(7,128),UZRAZ(7,18),UZPS(7,1)
80       DIM OBFZ(16,132),TMRT(7,1),KSUPZ(7),NMCZ(1,8)
90       DIM RECD(2,127),RECIZ(1,127)
100      '
110      '
```

```
120     GOSUB 340           'INITIALIZE
130     GOSUB 2570          'ESTABLISH LINKS
140     GOSUB 3100          'INITIATE REPORTING
150     SCREEN 9
160     CLS
170     '
180     '
190     ' MAIN LOOP
200     '
210     '
220     A$=INKEY$                           'SEE IF KEYBOARD INPUT
230     IF LEN(A$)<>0 THEN GOSUB 5480       ' IF SO GOSUB
240     IF EOF(1)=0 THEN GOSUB 3250 ELSE GOSUB 6470
250     IF OHPTR%>0 THEN GOSUB 5210         'SEE IF OUTPUT BUFFER
260     GOSUB 6890                          'CHECK TIMERS
270     IF IHPTR%<>ITPTR% THEN GOSUB 3630   'SEE IF INPUT BUFFER
280     GOTO 220
290     '
300     '
310     '         INITIALIZATION PROCECURES
320     '
330     '
340     ERMS$(0)="                                    "
350     ERMS$(1)="ADDRESS ALREADY USED                "
360     ERMS$(2)="CAN'T LINK WITH YOURSELF            "
370     ERMS$(3)="CAN'T REPEAT THROUGH YOURSELF       "
380     ERMS$(4)="CAN'T LINK REMOTE TO ITSELF         "
390     ERMS$(5)="ALREADY LINKING                     "
400     ERMS$(6)="ONLY EIGHT LINKS ALLOWED            "
410     ERMS$(7)="ONLY EIGHT PARTICIPANTS ALLOWED"
420     '
430     NMC%(0,1)=-2
440     NMC%(1,1)=-1
450     NMC%(0,2)=-2
460     NMC%(1,2)=-2
470     NMC%(0,3)=-2
480     NMC%(1,3)=-2
490     NMC%(0,4)=2
500     NMC%(1,4)=1
510     NMC%(0,5)=2
520     NMC%(1,5)=-3
530     NMC%(0,6)=1
540     NMC%(1,6)=-3
550     NMC%(0,7)=-2
560     NMC%(1,7)=-3
570     NMC%(0,8)=-2
580     NMC%(1,8)=-1
590     UD$(1)="E2D6R2L4"
600     UD$(2)="E1R2F1D1G1L2G1D2R4"
610     UD$(3)="E1R2F1D1G1L1R1F1D1G1L2H1"
620     UD$(4)="L4U1E3D6"
630     UD$(5)="L4D2F1R2F1D1G1L2H1"
640     UD$(6)="L2G1D4F1R2E1U1H1L2"
650     UD$(7)="R4D1G4D1"
660     UD$(8)="U1E1R2F1D1G1L2G1D1F1R2E1U1"
670     '
```

```
680    KSUP%(0)=&HC0
690    KSUP%(1)=2
700    KSUP%(3)=&HC0
710    KSUP%(4)=&HC0
720    KSUP%(5)=3
730    KSUP%(6)=5
740    KSUP%(7)=&HC0
750    TRM%=1
760    '
770    MMAX%=338
780    OPEN 'F:RMAP.DAT' FOR INPUT AS #2      'LOAD COAST MAP
790    FOR WC%=0 TO MMAX%
800    INPUT#2,MAP%(WC%,0),MAP%(WC%,1)
810    NEXT WC%
820    CLOSE #2
830    '
840    MCT%=0                                  'MAPPING CONSTANTS
850    ES=8.181881E-02*8.181881E-02
860    AN=2.092564E+07
870    XF=.08276
880    YF=.05985
890    XOF%=454
900    YOF%=263
910    '
920    IHPTR%=0                                'INPUT AND USER BUFFER SETUP
930    ITPTR%=0
940    UZRC%=7
950    IHBC%=7
960    ESCM%=0
970    FOR UZRN%=0 TO UZRC%
980    FOR WC%=0 TO 4
990    UZRA%(UZRN%,WC%)=0
1000   NEXT WC%
1010   TMRT(UZRN%,0)=-1
1020   TMRT(UZRN%,1)=-1
1030   NEXT UZRN%
1040   FOR BFC%=0 TO IHBC%
1050   IHB%(BFC%,0)=0
1060   NEXT BFC%
1070   '
1080   OHPTR%=0                                'SET UP OUTPUT BUFFER0
1090   OTPTR%=0
1100   OBC%=16
1110   FOR OBN%=1 TO OBC%
1120   OBF%(OBN%,0)=0
1130   OBF%(OBN%,1)=-1
1140   OBF%(OBN%,2)=0
1150   NEXT OBN%
1160   '
1170   UZRA%(0,5)=ASC('P')                     'SET UP OWN ADDRESS
1180   UZRA%(0,6)=ASC('L')
1190   UZRA%(0,7)=ASC('P')
1200   UZRA%(0,8)=ASC('0')
1210   UZRA%(0,9)=ASC('0')
1220   UZRA%(0,10)=ASC('1')
1230   '
```

```
1240    CLS
1250    PRINT "PACKET LORAN POSITION REPORTING SYSTEM"
1260    PRINT:PRINT
1270    PRINT "DESTINATION       RELAY LINK"
1280    CRL%=6
1290    UZRN%=1
1300    REMN%=1
1310    LOCATE 15,1,1
1320    CRC%=1
1330    COLOR 7
1340    PRINT "
1350    LOCATE 15,1,1
1360    PRINT "DESTINATION ";REMN%;" ADDRESS ";
1370    INPUT A$
1380    INL%=LEN(A$)
1390    IF INL%=0 THEN 2110
1400    GOSUB 2350
1410    ERM%=0
1420    IF AMTH%=0 THEN ERM%=2
1430    IF AMTH%>UZRC% THEN 1470
1440    IF (UZRA%(AMTH%,2) AND &H1)>0 THEN ERM%=1
1450    GOSUB 2300
1460    IF ERM%>0 THEN 1310 ELSE 1530
1470    IF UZRN%>UZRC% THEN 2050
1480    FOR WC%=5 TO 10
1490    UZRA%(UZRN%,WC%)=ADT%(WC%-5)
1500    NEXT WC%
1510    AMTH%=UZRN%
1520    UZRN%=UZRN%+1
1530    UZRA%(AMTH%,2)=UZRA%(AMTH%,2) OR &H1
1540    GOSUB 2230
1550    CRC%=CRC%+18
1560    REMN%=REMN%+1
1570    CURU%=AMTH%
1580    RPTN%=1
1590    LOCATE 15,1,1
1600    COLOR 7
1610    PRINT "
1620    LOCATE 15,1,1
1630    PRINT "REPEATER ";RPTN%; "ADDRESS ";
1640    INPUT A$
1650    INL%=LEN(A$)
1660    IF INL%>0 THEN 1690
1670    CRL%=CRL%+1
1680    GOTO 1310
1690    ERM%=0
1700    IF RPTN%>8 THEN ERM%=6
1710    GOSUB 2300
1720    IF ERM%>0 THEN 1670
1730    GOSUB 2350
1740    IF AMTH%=0 THEN ERM%=3
1750    IF AMTH%=CURU% THEN ERM%=4
1760    IF UZRA%(CURU%,4)=0 THEN 1800
1770    FOR WC%=11 TO (UZRA%(CURU%,4)-1)
1780    IF UZRA%(CURU%,WC%)=AMTH% THEN ERM%=5
1790    NEXT WC%
```

```
1800    GOSUB 2300
1810    IF ERM%>0 THEN 1590
1820    IF AMTH%<=UZRC% THEN 1890
1830    IF UZRN%>UZRC% THEN 2050
1840    FOR WC%=5 TO 10
1850    UZRA%(UZRN%,WC%)=ADT%(WC%-5)
1860    NEXT WC%
1870    AMTH%=UZRN%
1880    UZRN%=UZRN%+1
1890    UZRA%(AMTH%,2)=UZRA%(AMTH%,2) OR &H2
1900    GOSUB 2230
1910    CRC%=CRC%+8
1920    RPTA%=UZRA%(CURU%,4)
1930    IF RPTA%=0 THEN RPTA%=11
1940    UZRA%(CURU%,RPTA%)=AMTH%
1950    IF RPTA%=11 THEN 2010
1960    IF UZRA%(AMTH%,4)>0 THEN 2010
1970    FOR WC%=11 TO (RPTA%-1)
1980    UZRA%(AMTH%,WC%)=UZRA%(CURU%,WC%)
1990    NEXT WC%
2000    UZRA%(AMTH%,4)=RPTA%
2010    UZRA%(CURU%,4)=RPTA%+1
2020    RPTN%=RPTN%+1
2030    GOTO 1590
2040    '
2050    ERM%=7
2060    GOSUB 2300
2070    LOCATE 15,1,1
2080    COLOR 7
2090    INPUT "START OVER (S), OR CONTINUE (C) ";A$
2100    IF A$="S" THEN 920
2110    LOCATE 15,1,1
2120    INPUT "IS THIS RIGHT (Y OR N) ";A$
2130    IF (ASC(A$) AND &H5F)=&H4E THEN 920
2140    MXU%=UZRN%-1
2150    KSUP%(2)=256/(MXU%+2)
2160    OPEN "COM1:1200,N,8" AS #1
2170    FOR I%=0 TO 7
2180    PRINT#1,CHR$(KSUP%(I%));
2190    NEXT I%
2200    RETURN
2210    '
2220    '
2230    LOCATE CRL%,CRC%,0
2240    COLOR 7
2250    FOR WC%=5 TO 10
2260    PRINT CHR$(UZRA%(AMTH%,WC%));
2270    NEXT WC%
2280    RETURN
2290    '
2300    LOCATE 23,1,0
2310    COLOR 12
2320    PRINT ERMS$(ERM%);
2330    RETURN
2340    '
2350    FOR WC%=1 TO INL%
```

```
2360    ADT%(WC%-1)=ASC(MID$(A$,WC%,1))
2370    NEXT WC%
2380    IF INL=6 THEN 2420
2390    FOR WC%=INL%+1 TO 6
2400    ADT%(WC%-1)=32
2410    NEXT WC%
2420    IF UZRN%=0 THEN 2490
2430    FOR AMTH%=0 TO UZRN%-1
2440    FOR WC%=0 TO 5
2450    IF UZRA%(AMTH%,(WC%+5))<>ADT%(WC%) THEN 2480
2460    NEXT WC%
2470    RETURN
2480    NEXT AMTH%
2490    AMTH%=UZRC%+1
2500    RETURN
2510    '
2520    '
2530    '
2540    ' ESTABLISH LINKS
2550    '
2560    '
2570    CLS
2580    PRINT "ESTABLISHING LINKS"
2590    PRINT :PRINT: PRINT
2600    DSTC%=0
2610    FOR UZRN%=1 TO 7
2620    IF (UZRA%(UZRN%,2) AND &H1)=0 THEN 2640
2630    DSTC%=DSTC%+1
2640    NEXT UZRN%
2650    FOR UZRN%=1 TO 7
2660    IF (UZRA%(UZRN%,2) AND &H1)=0 THEN 2730
2670    STTS%=51
2680    RPC%=UZRA%(UZRN%,4)
2690    IF RPC%>0 THEN RPC%=RPC%-11
2700    TMCY=(DSTC%+1!)+(RPC%*2!)
2710    UZRA%(UZRN%,1)=(TMCY*10)+UZRN%
2720    GOSUB 4230
2730    NEXT UZRN%
2740    '
2750    '
2760    IF EOF(1)=0 THEN GOSUB 3250
2770    IF IHPTR%<>ITPTR% THEN GOSUB 3630
2780    IF OHPTR%>0 THEN GOSUB 5210
2790    GOSUB 6890  'CHECK TIMERS
2800    FOR UZRN%=1 TO MXU%
2810    IF UZRA%(UZRN%,0)>0 THEN 2760
2820    NEXT UZRN%
2830    NEST%=0
2840    FOR UZRN%=1 TO MXU%
2850    IF (UZRA%(UZRN%,2) AND &H1)=0 THEN 2970
2860    A$=""
2870    FOR BC%=5 TO 10
2880    A$=A$+CHR$(UZRA%(UZRN%,BC%))
2890    NEXT BC%
2900    IF UZRA%(UZRN%,3)>0 THEN 2950
2910    PRINT "LINK TO ";A$;" NOT ESTABLISHED"
```

```
2920        PRINT
2930        NEST%=1
2940        GOTO 2970
2950        PRINT "LINK TO ";A$;" OK"
2960        PRINT
2970        NEXT UZRN%
2980        IF NEST%=0 THEN RETURN
2990        PRINT "SELECT - (1) CONTINUE, (2) TRY AGAIN, (3) EXIT "
3000        INPUT SEL%
3010        IF SEL%=1 THEN RETURN
3020        IF SEL%=2 THEN 1080
3030        IF SEL%=3 THEN 7450 ELSE 2990
3040        '
3050        '
3060        '
3070        ' INITIATE REPORT MODE
3080        '
3090        '
3100        TRM%=0
3110        FOR UZRN%=1 TO MXU%
3120        IF (UZRA%(UZRN%,2) AND &H1)=0 THEN 3160
3130        TMRT(UZRN%,1)=TIMER+(UZRA%(UZRN%,1)*.8)
3140        STTS%=52
3150        GOSUB 4230
3160        NEXT UZRN%
3170        OPEN "F:PLPD.DAT" FOR OUTPUT AS #2
3180        RCNT%=0
3190        RETURN
3200        '
3210        '
3220        '
3230        ' HOLDING BUFFER INPUT
3240        '
3250        IP%=ASC(INPUT$(1,#1))
3260        IF IHB%(IHPTR%,0)<>0 THEN 3300
3270        IF IP%=&HC0 THEN 3410
3280        IF IP%=&H0 THEN 3560 ELSE 3410
3290        '
3300        IF IP%<>&HC0 THEN 3450
3310        IF IHB%(IHPTR%,0)<16 THEN 3410
3320        IF ESCM%<>0 THEN 3410
3330        IHB%(IHPTR%,0)=IHB%(IHPTR%,0)-1
3340        IHPTR%=IHPTR%+1
3350        IF IHPTR%>7 THEN IHPTR%=0
3360        IF IHPTR%<>ITPTR% THEN RETURN
3370        LOCATE 23,1,0
3380        COLOR 12
3390        PRINT "INPUT BUFFER OVERFLOW";
3400        RETURN
3410        ESCM%=0
3420        IHB%(IHPTR%,0)=0
3430        RETURN
3440        '
3450        IF IP%<>&HDB THEN 3500
3460        IF ESCM%=1 THEN 3410
3470        ESCM%=1
```

```
3480    RETURN
3490    '
3500    IF ESCM%=0 THEN 3550
3510    ESCM%=0
3520    IF IP%=&HDD THEN IP%=&HDB
3530    IF IP%=&HDC THEN IP%=&HC0
3540    IF (IP%<>&HDB)AND(IP%<>&HC0) THEN 3410
3550    IHB%(IHPTR%,IHB%(IHPTR%,0))=IP%
3560    IHB%(IHPTR%,0)=IHB%(IHPTR%,0)+1
3570    IF IHB%(IHPTR%,0)>340 THEN 3410
3580    RETURN
3590    '
3600    '
3610    ' PROCESS INPUT BUFFER
3620    '
3630    FOR WC%=1 TO 6
3640    IF UZRA%(0,(WC%+4))<>(IHB%(ITPTR%,WC%)/2) THEN 4010
3650    NEXT WC%
3660    BCT%=14
3670    IF (IHB%(ITPTR%,BCT%)AND &H1)<>0 THEN 3730
3680    FOR BCT%=21 TO 70 STEP 7
3690    IF (IHB%(ITPTR%,BCT%)AND &H1)<>0 THEN 3720
3700    NEXT BCT%
3710    GOTO 4010
3720    IF (IHB%(ITPTR%,BCT%)AND &H80) =0 THEN 4010
3730    CRM%=(IHB%(ITPTR%,7)/64)+(IHB%(ITPTR%,14)/128)
3740    IF (CRM%<1)OR(CRM%>2) THEN 4010
3750    FOR UZRN%=1 TO MXUX%
3760    FOR WC%=5 TO 10
3770    IF (IHB%(ITPTR%,(WC%+3))/2)<>UZRA%(UZRN%,WC%) THEN 3800
3780    NEXT WC%
3790    GOTO 3820
3800    NEXT UZRN%
3810    GOTO 4010
3820    BCT%=BCT%+1
3830    IF BCT%>IHB%(ITPTR%,0) THEN 4010
3840    IF (IHB%(ITPTR%,BCT%) AND &HEF)<>&H0 THEN 3920       'RESPONSE
3850    IF CRM%<>2 THEN 4010
3860    IF IHB%(ITPTR%,BCT%)=&H10 THEN GOSUB 4100
3870    BCT%=BCT%+2
3880    IF BCT%>IHB%(ITPTR%,0) THEN 4010
3890    IF IHB%(ITPTR%,BCT%)=49 THEN GOSUB 5850    'POSITION
3900    GOTO 4000
3910    '
3920    IF IHB%(ITPTR%,BCT%)<>&H11 AND IHB%(ITPTR%,BCT%)<>&H15 THEN 4010
3930    IF IHB%(ITPTR%,BCT%)=&H11 AND TRM%=1 THEN 4010
3940    IF IHB%(ITPTR%,BCT%)=&H15 AND TRM%=0 THEN 4010
3950    IF UZRA%(UZRN%,0)=0 THEN 4010
3960    GOSUB 5040
4000    IF TMRT(UZRN%,1)>=0 THEN TMRT(UZRN%,1)=TIMER+(UZRA%(UZRN%,1)*.5)
4010    IHB%(ITPTR%,0)=0
4020    ITPTR%=ITPTR%+1
4030    IF ITPTR%>7 THEN ITPTR%=0
4040    RETURN
4050    '
4060    '
```

```
4070      ' SEND RESPONSE
4080      '
4090      '
4100      GOSUB 5040
4110      CRM%=1
4120      GOSUB 4460
4130      OFS%=OFS%+1
4140      OBF%(OBFN%,OFS%)=&H11
4150      OBF%(OBFN%,0)=OFS%
4160      GOSUB 4880
4170      RETURN
4180      '
4190      '
4200      ' SEND REQUEST FOR STATUS
4210      '
4220      '
4230      IF UZRA%(UZRN%,0)<>0 THEN RETURN
4240      CRM%=2
4250      GOSUB 4460
4260      OBF%(OBFN%,(OFS%+1))=&H10
4270      OBF%(OBFN%,(OFS%+2))=&HF0
4280      OBF%(OBFN%,(OFS%+3))=STTS%
4290      OBF%(OBFN%,0)=OFS%+3
4300      IF STTS%=51 THEN 4340
4310      OBF%(OBFN%,(OFS%+4))=UZRA%(UZRN%,1)
4320      OBF%(OBFN%,0)=OFS%+4
4330      GOTO 4370
4340      OBF%(OBFN%,(OFS%+4))=KSUP%(2)
4350      OBF%(OBFN%,(OFS%+5))=KSUP%(6)+UZRN%
4360      OBF%(OBFN%,0)=OFS%+5
4370      UZRA%(UZRN%,3)=5
4380      TMRT(UZRN%,0)=-1
4390      GOSUB 4880
4400      RETURN
4410      '
4420      '
4430      ' FIND OUTPUT BUFFER AND PACK ADDRESS
4440      '
4450      '
4460      FOR OBFN%=1 TO OBC%
4470      IF OBF%(OBFN%,0)=0 THEN 4520
4480      NEXT OBFN%
4490      LOCATE 23,1,0
4500      PRINT "OUTPUT BUFFERS FULL"
4510      RETURN
4520      FOR WC%=5 TO 10
4530      OBF%(OBFN%,WC%)=UZRA%(UZRN%,WC%)*2
4540      OBF%(OBFN%,(WC%+7))=UZRA%(0,WC%)*2
4550      NEXT WC%
4560      IF CRM%<>1 THEN 4600
4570      OBF%(OBFN%,11)=0
4580      OBF%(OBFN%,18)=128
4590      GOTO 4620
4600      OBF%(OBFN%,11)=128
4610      OBF%(OBFN%,18)=0
4620      OFS%=19
```

```
4630    TMP%=UZRA%(UZRN%,4)
4640    IF TMP%=0 THEN 4730
4650    FOR WC%=11 TO TMP%-1
4660    FOR BC%=5 TO 10
4670    OBF%(OBFN%,OFS%)=UZRA%(UZRA%(UZRN%,WC%),BC%)*2
4680    OFS%=OFS%+1
4690    NEXT BC%
4700    OBF%(OBFN%,OFS%)=2
4710    OFS%=OFS%+1
4720    NEXT WC%
4730    OFS%=OFS%-1
4740    OBF%(OBFN%,OFS%)=OBF%(OBFN%,OFS%)OR 1
4750    OBF%(OBFN%,0)=OFS%
4760    OBF%(OBFN%,3)=UZRN%
4770    IF CRM%=1 THEN RETURN
4780    IF UZRA%(UZRN%,0)=0 THEN 4800
4790    OBF%(UZRA%(UZRN%,0),0)=0
4800    UZRA%(UZRN%,0)=OBFN%
4810    RETURN
4820    '
4830    '
4840    '
4850    ' LINK OUTPUT BUFFER
4860    '
4870    '
4880    IF OTPTR%=0 THEN 4940
4890    OBF%(OTPTR%,2)=OBFN%
4900    OBF%(OBFN%,1)=OTPTR%
4910    OBF%(OBFN%,2)=0
4920    OTPTR%=OBFN%
4930    RETURN
4940    OBF%(OBFN%,1)=0
4950    OBF%(OBFN%,2)=0
4960    OTPTR%=OBFN%
4970    OHPTR%=OBFN%
4980    RETURN
4990    '
5000    '
5010    '        UNLINK AND CLEAR BUFFER
5020    '
5030    '
5040    IF UZRA%(UZRN%,0)=0 THEN RETURN
5050    UBN%=UZRA%(UZRN%,0)
5055    IF OBF%(UBN%,1)<0 THEN 5130
5060    IF OBF%(UBN%,1)=0 THEN OHPTR%=OBF%(UBN%,2)
5070    IF OBF%(UBN%,1)<>0 THEN OBF%(OBF%(UBN%,1),2)=OBF%(UBN%,2)
5080    IF OBF%(UBN%,2)=0 THEN OTPTR%=OBF%(UBN%,2)
5090    IF OBF%(UBN%,2)<>0 THEN OBF%(OBF%(UBN%,2),1)=OBF%(UBN%,1)
5100    OBF%(UBN%,1)=-1
5110    OBF%(UBN%,2)=0
5120    OBF%(UBN%,0)=0
5130    UZRA%(UZRN%,0)=0
5140    TMRT(UZRN%,0)=-1
5150    RETURN
5160    '
5170    '
```

```
5180        ' PRINT OUTPUT BUFFER
5190        '
5200        '
5210        IF OBF%(OHPTR%,0)=0 THEN 5390
5220        PRINT#1,CHR$(&HC0);                'HEADER BYTE
5230        PRINT#1,CHR$(&H0);                 'CONTROL BYTE
5240        FOR WC%=5 TO OBF%(OHPTR%,0)
5250        A$=CHR$(OBF%(OHPTR%,WC%))
5260        IF A$<>CHR$(&HC0) THEN 5300
5270        PRINT#1,CHR$(&HDB);
5280        PRINT#1,CHR$(&HDC);
5290        GOTO 5320
5300        PRINT#1,A$;
5310        IF A$=CHR$(&HDB) THEN PRINT#1,CHR$(&HDD);
5320        NEXT WC%
5330        PRINT#1,CHR$(&HC0);
5340        PRINT#1,CHR$(&HD);
5350        IF (OBF%(OHPTR%,11)AND &H80)<>0 THEN 5380
5360        OBF%(OHPTR%,0)=0
5365        UZRA%(OBF%(OHPTR%,3),0)=0
5370        GOTO 5390
5380        TMRT(OBF%(OHPTR%,3),0)=TIMER+(UZRA%(OBF%(OHPTR%,3),1)*.2)
5390        OBF%(OHPTR%,1)=-1
5395        OHPTR%=OBF%(OHPTR%,2)
5400        OBF%(OHPTR%,1)=0
5410        IF OHPTR%=0 THEN OTPTR%=0
5420        RETURN
5430        '
5440        '
5450        ' PROCESS KEYBOARD ENTRY
5460        '
5470        '
5480        A%=VAL(A$)+1
5490        IF A%<10 THEN CLS
5500        MCT%=0
5510        ON A% GOTO 5710,5530,5580,5630,5650,5670,5690,5780,5760,7230
5520        RETURN
5530        XF=XF*1.5
5540        YF=YF*1.5
5550        XOF%=((XOF%-400)*1.5)+400
5560        YOF%=((YOF%-175)*1.5)+175
5570        RETURN
5580        XF=XF/1.5
5590        YF=YF/1.5
5600        XOF%=((XOF%-400)/1.5)+400
5610        YOF%=((YOF%-175)/1.5)+175
5620        RETURN
5630        XOF%=XOF%+100
5640        RETURN
5650        XOF%=XOF%-100
5660        RETURN
5670        YOF%=YOF%+72
5680        RETURN
5690        YOF%=YOF%-72
5700        RETURN
5710        XF=.08276
```

```
5720    YF=.05985
5730    XOF%=454
5740    YOF%=263
5750    RETURN
5760    CLOSE #1
5770    OPEN "COM1:1200,N,8" AS #1
5780    RETURN
5790    '
5800    '
5810    '
5820    ' PROCESS POSITION DATA
5830    '
5840    '
5850    LONG=IHB%(ITPTR%,(BCT%+1))
5860    LONG=LONG+(IHB%(ITPTR%,(BCT%+2))*256!)
5870    LONG=LONG+((IHB%(ITPTR%,(BCT%+3))AND &H7F)*65536!)
5880    LONG=LONG/10000!
5890    IF (IHB%(ITPTR%,(BCT%+3))AND &H80)>0 THEN LONG=-LONG
5900    LAT=IHB%(ITPTR%,(BCT%+4))
5910    LAT=LAT+(IHB%(ITPTR%,(BCT%+5))*256!)
5920    LAT=LAT+((IHB%(ITPTR%,(BCT%+6))AND &H7F)*65536!)
5930    LAT=LAT/10000!
5940    IF (IHB%(ITPTR%,(BCT%+6))AND &H80)>0 THEN LAT=-LAT
5950    LAT=LAT*355/(113*180)
5960    LONG=LONG*355/(113*180)
5970    '
5980    RECD(0,RCNT%)=TIMER
5990    RECD(1,RCNT%)=LAT
6000    RECD(2,RCNT%)=LONG
6010    RECI%(0,RCNT%)=UZRN%
6020    RECI%(1,RCNT%)=IHB%(ITPTR%,(BCT%+7))
6030    RCNT%=RCNT%+1
6040    IF RCNT%<=127 GOTO 6110
6050    FOR N%=0 TO 127
6060    PRINT#2,RECD(0,N%);RECD(1,N%);RECD(2,N%);
6070    PRINT#2,RECI%(0,N%);RECI%(1,N%);
6080    NEXT N%
6090    RCNT%=0
6100    '
6110    SL=SIN(LAT)
6120    N=AN/SQR(1-(ES*(SL*SL)))
6130    XG=N*COS(LAT)*COS(LONG)
6140    YG=N*COS(LAT)*SIN(LONG)
6150    ZG=N*(1-ES)*SL
6160    XO=XG+8440322!
6170    YO=YG+1.515085E+07
6180    ZO=ZG-1.166928E+07
6190    XT=(XO*.8735892)+(YO*(-.4866641))
6200    YT=(XO*.2729335)+(YO*.4899308)+(ZO*.8279308)
6210    'ZT=(XO*(-.4029259))+(YO*(-.7232745))+(ZO*.5608253)
6220    XC=XT/119.683
6230    YC=YT/119.683
6240    XCN=(XC*XF)+XOF%+NMC%(0,UZRN%)
6250    XCO=(UZPS(UZRN%,0)*XF)+XOF%+NMC%(0,UZRN%)
6260    YCN=350-((YC*YF)+YOF%+NMC%(1,UZRN%))
6270    YCO=350-((UZPS(UZRN%,1)*YF)+YOF%+NMC%(1,UZRN%))
```

```
6280        PSET (XC0,YC0),0
6290        DRAW UD$(UZRN%)
6300        PSET (XCN,YCN),12
6310        DRAW UD$(UZRN%)
6320        UZPS(UZRN%,0)=XC
6330        UZPS(UZRN%,1)=YC
6340        LOCATE ((UZRN%*3)+1),1
6350        COLOR 15
6360        IF IHB%(ITPTR%,(BCT%+7))<64 THEN COLOR 14
6370        PRINT "X = ";
6380        PRINT USING "+######";XT
6390        PRINT "Y = ";
6400        PRINT USING "+######";YT
6410        RETURN
6420        '
6430        '
6440        ' DRAW MAP LINE
6450        '
6460        '
6470        IF MCT%<=MMAX% THEN 6520
6480        CIRCLE (XOF%,(350-YOF%)),4,15
6490        MCT%=0
6500        RETURN
6510        '
6520        IF (MAP%(MCT%,0) AND &H2000)=0 THEN 6560
6530        MCLR%=MAP%(MCT%,0) AND &H1FFF
6540        GOTO 6660
6550        '
6560        COLOR MCLR%
6570        XSGP%=MAP%(MCT%,0) AND &H1FFF
6580        XSC=((XSGP%-3571)*XF)+XOF%
6590        YSC=350-(((MAP%(MCT%,1)-4397)*YF)+YOF%)
6600        IF (MAP%(MCT%,0) AND &H4000)=0 THEN 6630
6610        IF XSC>128 THEN PSET (XSC,YSC)
6620        GOTO 6640
6630        GOSUB 6700
6640        XSC0=XSC
6650        YSC0=YSC
6660        MCT%=MCT%+1
6670        RETURN
6680        '
6690        '
6700        XSC1=XSC
6710        YSC1=YSC
6720        IF XSC0<128 THEN 6780
6730        IF XSC1>=128 THEN 6820
6740        XRT=(XSC0-128)/(XSC0-XSC1)
6750        YSC1=YSC0-((YSC0-YSC1)*XRT)
6760        XSC1=128
6770        GOTO 6820
6780        IF XSC1<128 THEN RETURN
6790        XRT=(XSC1-128)/(XSC1-XSC0)
6800        YSC0=YSC1-((YSC1-YSC0)*XRT)
6810        XSC0=128
6820        LINE (XSC0,YSC0)-(XSC1,YSC1)
6830        RETURN
```

```
6840    '
6850    '
6860    ' CHECK TIMERS
6870    '
6880    '
6890    T1=TIMER
6900    FOR UZRN%=1 TO MXU%
6910    IF TMRT(UZRN%,0)<0 THEN 6930
6920    IF TMRT(UZRN%,0)<T1 THEN GOSUB 7060
6930    IF TMRT(UZRN%,1)<0 THEN 7030
6940    IF TMRT(UZRN%,1)>T1 THEN 7030
6950    IF TRM%>0 THEN RETURN
6960    STTS%=52
6970    GOSUB 4230
6980    LOCATE ((UZRN%*3)+1),1
6990    COLOR 12
7000    PRINT "TIME OUT    "
7010    PRINT "            "
7020    TMRT(UZRN%,1)=T1+(UZRA%(UZRN%,1)*.5)
7030    NEXT UZRN%
7040    RETURN
7050    '
7060    IF UZRA%(UZRN%,3)<=0 THEN 7120
7070    UZRA%(UZRN%,3)=UZRA%(UZRN%,3)-1
7080    OBFN%=UZRA%(UZRN%,0)
7090    GOSUB 4880
7100    TMRT(UZRN%,0)=-1
7110    RETURN
7120    GOSUB 5040
7130    OBF%(UZRA%(UZRN%,0),0)=0
7140    UZRA%(UZRN%,0)=0
7150    TMRT(UZRN%,0)=-1
7160    RETURN
7170    '
7180    '
7190    '
7200    ' TERMINATE
7210    '
7220    '
7230    TRM%=1
7240    FOR UZRN%=1 TO MXU%
7250    GOSUB 5040
7260    TMRT(UZRN%,1)=-1
7270    IF (UZRA%(UZRN%,2) AND &H1)=0 THEN 7300
7280    STTS%=53
7290    GOSUB 4230
7300    NEXT UZRN%
7310    IF EOF(1)=0 THEN GOSUB 3250
7320    IF OHPTR%>0 THEN GOSUB 5210      'SEE IF OUTPUT BUFFER
7330    GOSUB 6890                       'CHECK TIMERS
7340    IF IHPTR%<>ITPTR% THEN GOSUB 3630  'SEE IF INPUT BUFFER
7350    FOR UZRN%=1 TO MXU%
7360    IF UZRA%(UZRN%,0)>0 THEN 7310
7370    NEXT UZRN%
7380    NS%=RCNT%-1
7390    IF NS%<1 GOTO 7440
```

```
7400    FOR N%=0 TO NS%
7410    PRINT#2,RECD(0,N%);RECD(1,N%);RECD(2,N%);
7420    PRINT#2,RECI%(0,N%);RECI%(1,N%);
7430    NEXT N%
7440    CLOSE #2
7450    END
10      '
20      '
30      '         REMS.BAS     REMOTE SITE PACKET LORAN SYSTEM
40      '
50      '
60      '
70      DIM ADT%(5),KSUP%(7),LBF%(29)
80      DIM IHB%(7,128),UZRA%(7,18)
90      DIM OBF%(16,132)
100     '
110     '
120     GOSUB 310              'INITIALIZE
130     '
140     '
150     ' MAIN LOOP
160     '
170     '
180     IF EOF(1)=0 THEN GOSUB 960        'SEE IF INPUT DATA AVAIL.
190     IF OHPTR%>0 THEN GOSUB 3780
200     IF IHPTR%<>ITPTR% THEN GOSUB 1370
210     GOSUB 4540
220     IF LCM%<0 THEN 180
230     IF EOF(2)=0 THEN GOSUB 4020
240     GOTO 180
250     '
260     '
270     '         INITIALIZATION PROCECURES
280     '
290     '
300     '
310     CLS
320     CLOSE
330     IHPTR%=0                          'INPUT AND USER BUFFER SETUP
340     ITPTR%=0
350     UZRC%=7
360     IHBC%=7
370     ESCM%=0
380     FOR UZRN%=0 TO UZRC%
390     FOR WC%=0 TO 4
400     UZRA%(UZRN%,WC%)=0
410     NEXT WC%
440     NEXT UZRN%
450     FOR BFC%=0 TO IHBC%
460     IHB%(BFC%,0)=0
470     NEXT BFC%
480     '
490     KSUP%(0)=&HC0
500     KSUP%(1)=2
510     KSUP%(3)=&HC0
520     KSUP%(4)=&HC0
```

```
530     KSUP%(5)=3
540     KSUP%(7)=&HC0
550     '
560     OHPTR%=0                            'SET UP OUTPUT BUFFER0
570     OTPTR%=0
580     OBC%=16
590     FOR OBN%=1 TO OBC%
600     OBF%(OBN%,0)=0
610     OBF%(OBN%,1)=-1
620     OBF%(OBN%,2)=0
630     NEXT OBN%
640     STTS=-1!
650     CYC%=0
660     IRC%=0
670     '
680     UZRA%(0,5)=ASC("P")                 'SET UP OWN ADDRESS
690     UZRA%(0,6)=ASC("L")
700     UZRA%(0,7)=ASC("P")
710     UZRA%(0,8)=ASC("0")
720     UZRA%(0,9)=ASC("0")
730     UZRA%(0,10)=ASC("2")
740     '
750     UZRA%(1,5)=ASC("P")                 'SET UP BASE ADDRESS
760     UZRA%(1,6)=ASC("L")
770     UZRA%(1,7)=ASC("P")
780     UZRA%(1,8)=ASC("0")
790     UZRA%(1,9)=ASC("0")
800     UZRA%(1,10)=ASC("1")
810     '
820     LBF%(0)=0                           'INIT LORAN BUFFER
830     ERC%=0
840     LCM%=-1
850     TL=-1
860     '
870     CLS
880     OPEN "COM1:1200,N,8" AS #1
890     '
900     RETURN
910     '
920     '
930     '
940     ' HOLDING BUFFER INPUT
950     '
960     ON ERROR GOTO 4950
970     IP%=ASC(INPUT$(1,#1))
980     ON ERROR GOTO 0
990     IRC%=0
1000    IF IHB%(IHPTR%,0)<>0 THEN 1040
1010    IF IP%=&HC0 THEN 1150
1020    IF IP%=&H0 THEN 1300 ELSE 1150
1030    '
1040    IF IP%<>&HC0 THEN 1190
1050    IF IHB%(IHPTR%,0)<16 THEN 1150
1060    IF ESCM%<>0 THEN 1150
1070    IHB%(IHPTR%,0)=IHB%(IHPTR%,0)-1
1080    IHPTR%=IHPTR%+1
```

```
1090    IF IHPTR%>7 THEN IHPTR%=0
1100    IF IHPTR%<>ITPTR% THEN RETURN
1110    LOCATE 23,1,0
1120    COLOR 12
1130    PRINT "INPUT BUFFER OVERFLOW";
1140    RETURN
1150    ESCM%=0
1160    IHB%(IHPTR%,0)=0
1170    RETURN
1180    '
1190    IF IP%<>&HDB THEN 1240
1200    IF ESCM%=1 THEN 1150
1210    ESCM%=1
1220    RETURN
1230    '
1240    IF ESCM%=0 THEN 1290
1250    ESCM%=0
1260    IF IP%=&HDD THEN IP%=&HDB
1270    IF IP%=&HDC THEN IP%=&HC0
1280    IF (IP%<>&HDB)AND(IP%<>&HC0) THEN 1150
1290    IHB%(IHPTR%,IHB%(IHPTR%,0))=IP%
1300    IHB%(IHPTR%,0)=IHB%(IHPTR%,0)+1
1310    IF IHB%(IHPTR%,0)>340 THEN 1150
1320    RETURN
1330    '
1340    '
1350    ' PROCESS INPUT BUFFER
1360    '
1370    FOR WC%=1 TO 6
1380    IF UZRA%(0,(WC%+4))<>(IHB%(ITPTR%,WC%)/2) THEN 1700
1390    NEXT WC%
1400    FOR WC%=5 TO 10
1410    IF (IHB%(ITPTR%,(WC%+3))/2)<>UZRA%(1,WC%) THEN 2230
1420    NEXT WC%
1430    CRM%=(IHB%(ITPTR%,7)/64)+(IHB%(ITPTR%,14)/128)
1440    IF (CRM%<1)OR(CRM%>2) THEN 2230
1450    BCT%=14
1460    IF (IHB%(ITPTR%,BCT%)AND &H1)<>0 THEN 1960
1470    FOR BCT%=21 TO 70 STEP 7
1480    IF (IHB%(ITPTR%,BCT%)AND &H1)<>0 THEN 1510
1490    NEXT BCT%
1500    GOTO 2230
1510    IF (IHB%(ITPTR%,BCT%)AND &H80) =0 THEN 1700
1520    ' PACK RETURN LINKS
1530    IF UZRA%(1,2)>0 THEN 1960
1540    UZRN%=2
1550    RPC%=11
1560    FOR CTR%=(BCT%-6) TO 15 STEP -7
1570    WCU%=5
1580    FOR WC%=0 TO 5
1590    UZRA%(UZRN%,(WC%+5))=IHB%(ITPTR%,(CTR%+WC%))/2
1600    WCU%=WCU%+1
1610    NEXT WC%
1620    UZRA%(1,RPC%)=UZRN%
1630    RPC%=RPC%+1
1640    UZRN%=UZRN%+1
```

```
1650        NEXT CTR%
1660        UZRA%(1,4)=RPC%-1
1670        UZRA%(1,2)=1
1680        GOTO 1960
1690        ' SEE IF RELAY
1700        IF (IHB%(ITPTR%,14)AND &H1)>0 THEN 2230
1710        FOR BCT%=15 TO 64 STEP 7
1720        FOR WC%=0 TO 5
1730        IF (IHB%(ITPTR%,(BCT%+WC%))/2)<>UZRA%(0,(WC%+5)) THEN 1760
1740        NEXT WC%
1750        GOTO 1780
1760        NEXT BCT%
1770        GOTO 2230
1780        IF BCT%=15 THEN 1800
1790        IF (IHB%(ITPTR%,(BCT%-1))AND &H80)=0 THEN 2230
1800        IF (IHB%(ITPTR%,(BCT%+6))AND &H80)<>0 THEN 2230
1810        IHB%(ITPTR%,(BCT%+6))=IHB%(ITPTR%,(BCT%+6)) OR &H80
1820        FOR OBFN%=1 TO 16
1830        IF OBF%(OBFN%,0)=0 THEN 1880
1840        NEXT OBFN%
1850        LOCATE 23,1,0
1860        PRINT 'OUTPUT BUFFERS FULL'
1870        GOTO 2230
1880        FOR WC%=1 TO IHB%(ITPTR%,0)
1890        OBF%(OBFN%,(WC%+4))=IHB%(ITPTR%,WC%)
1900        NEXT WC%
1910        OBF%(OBFN%,0)=IHB%(ITPTR%,0)+4
1920        OBF%(OBFN%,3)=0
1930        GOSUB 3450
1940        '
1950        GOTO 2230
1960        BCT%=BCT%+1
1970        IF BCT%>IHB%(ITPTR%,0) THEN 2230
1980        IF IHB%(ITPTR%,BCT%)<>&H10 THEN 2210
1990        IF CRM%<>2 THEN 2230
2000        BCT%=BCT%+2
2010        IF BCT%>IHB%(ITPTR%,0) THEN 2230
2020        STTS=-1!
2030        IF IHB%(ITPTR%,BCT%)<>52 THEN 2080
2040        STTS=IHB%(ITPTR%,(BCT%+1))/10
2050        SPT=TIMER+STTS-.5
2060        GOSUB 2320
2070        GOTO 2230
2080        IF IHB%(ITPTR%,BCT%)<>51 THEN 2150
2090        KSUP%(2)=IHB%(ITPTR%,(BCT%+1))
2100        KSUP%(6)=IHB%(ITPTR%,(BCT%+2))
2110        FOR I%=0 TO 7
2120        PRINT#1,CHR$(KSUP%(I%))
2130        NEXT I%
2140        GOTO 2170
2150        IF IHB%(ITPTR%,BCT%)<>53 THEN 2230
2160        STTS=-1
2170        GOSUB 2320
2180        UZRA%(1,2)=0
2190        UZRA%(1,4)=0
2200        GOTO 2230
2210        IF IHB%(ITPTR%,BCT%)<>&H11 THEN 2230
2220        CYC%=0
```

```
2230    IHB%(ITPTR%,0)=0
2240    ITPTR%=ITPTR%+1
2250    IF ITPTR%>7 THEN ITPTR%=0
2260    RETURN
2270    '
2280    '
2290    ' SEND RESPONSE
2300    '
2310    '
2320    GOSUB 3610
2330    CRM%=1
2340    UZRN%=1
2350    GOSUB 3030
2360    OFS%=OFS%+1
2370    OBF%(OBFN%,OFS%)=&H11
2380    IF STTS<0 THEN OBF%(OBFN%,OFS%)=&H15
2390    OBF%(OBFN%,(OFS%+1))=&HF0
2400    OBF%(OBFN%,0)=OFS%+1
2410    GOSUB 3450
2420    RETURN
2430    '
2440    '
2450    '
2460    ' SEND POSITION
2470    '
2480    '
2490    SPT=TIMER+STTS
2500    CRM%=2
2510    UZRN%=1
2520    GOSUB 3030
2530    OBF%(OBFN%,(OFS%+1))=&H0
2540    IF CYC%>9 THEN OBF%(OBFN%,(OFS%+1))=&H10
2550    PRINT CYC%
2560    CYC%=CYC%+1
2570    OBF%(OBFN%,(OFS%+2))=&HF0
2580    OBF%(OBFN%,(OFS%+3))=49
2590    SNL%=&H0
2600    IF LONG>0 THEN 2630
2610    LONG=-LONG
2620    SNL%=&H80
2630    TMP%=INT(LONG/6.5536)
2640    IF (TMP%*6.5536)>LONG THEN TMP%=TMP%-1
2650    IF (LONG-(TMP%*6.5536))>255 THEN TMP%=TMP%+1
2660    TMP1=LONG-(TMP%*6.5536)
2670    TMP2%=INT(TMP1*39.0625)
2680    IF (TMP2%/39.0625)>TMP1 THEN TMP2%=TMP2%-1
2690    IF (TMP1-(TMP2%/39.0625))>255 THEN TMP2%=TMP2%+1
2700    TMP3=TMP1-(TMP2%/39.0625)
2710    TMP4%=TMP3*10000!
2720    IF TMP4%>255 THEN TMP4%=255
2730    OBF%(OBFN%,(OFS%+4))=TMP4%
2740    OBF%(OBFN%,(OFS%+5))=TMP2%
2750    TMP%=TMP% OR SNL%
2760    OBF%(OBFN%,(OFS%+6))=TMP%
2762    SNL%=&H0
2764    IF LAT>0 THEN 2770
```

```
2766    LAT=-LAT
2768    SNL%=&H80
2770    TMP%=INT(LAT/6.5536)
2780    IF (TMP%*6.5536)>LAT THEN TMP%=TMP%-1
2790    IF (LAT-(TMP%*6.5536))>255 THEN TMP%=TMP%+1
2800    TMP1=LAT-(TMP%*6.5536)
2810    TMP2%=INT((TMP1*39.0625)+.5)
2820    IF (TMP2%/39.0625)>TMP1 THEN TMP2%=TMP2%-1
2830    IF (TMP1-(TMP2%/39.0625))>255 THEN TMP2%=TMP2%+1
2840    TMP3=TMP1-(TMP2%/39.0625)
2850    TMP4%=TMP3*10000!
2860    IF TMP4%>255 THEN TMP4%=255
2870    OBF%(OBFN%,(OFS%+7))=TMP4%
2880    OBF%(OBFN%,(OFS%+8))=TMP2%
2885    TMP%=TMP% OR SNL%
2890    OBF%(OBFN%,(OFS%+9))=TMP%
2900    OBF%(OBFN%,(OFS%+10))=SNM
2910    OBF%(OBFN%,0)=OFS%+10
2940    GOSUB 3450
2950    TL=-1
2960    LCM%=-1
2970    IF CYC%>20 THEN GOSUB 310
2980    RETURN
2990    '
3000    ' FIND OUTPUT BUFFER AND PACK ADDRESS
3010    '
3020    '
3030    FOR OBFN%=1 TO OBC%
3040    IF OBF%(OBFN%,0)=0 THEN 3090
3050    NEXT OBFN%
3060    LOCATE 23,1,0
3070    PRINT "OUTPUT BUFFERS FULL"
3080    RETURN
3090    FOR WC%=5 TO 10
3100    OBF%(OBFN%,WC%)=UZRA%(UZRN%,WC%)*2
3110    OBF%(OBFN%,(WC%+7))=UZRA%(0,WC%)*2
3120    NEXT WC%
3130    IF CRM%<>1 THEN 3170
3140    OBF%(OBFN%,11)=0
3150    OBF%(OBFN%,18)=128
3160    GOTO 3190
3170    OBF%(OBFN%,11)=128
3180    OBF%(OBFN%,18)=0
3190    OFS%=19
3200    TMP%=UZRA%(UZRN%,4)
3210    IF TMP%=0 THEN 3300
3220    FOR WC%=11 TO TMP%
3230    FOR BC%=5 TO 10
3240    OBF%(OBFN%,OFS%)=UZRA%(UZRA%(UZRN%,WC%),BC%)*2
3250    OFS%=OFS%+1
3260    NEXT BC%
3270    OBF%(OBFN%,OFS%)=2
3280    OFS%=OFS%+1
3290    NEXT WC%
3300    OFS%=OFS%-1
3310    OBF%(OBFN%,OFS%)=OBF%(OBFN%,OFS%) OR 1
3320    OBF%(OBFN%,0)=OFS%
```

```
3330        OBF%(OBFN%,3)=UZRN%
3340        IF CRM%=1 THEN RETURN
3350        IF UZRA%(UZRN%,0)=0 THEN 3370
3360        OBF%(UZRA%(UZRN%,0),0)=0
3370        UZRA%(UZRN%,0)=OBFN%
3380        RETURN
3390        '
3400        '
3410        '
3420        ' LINK OUTPUT BUFFER
3430        '
3440        '
3450        IF OTPTR%=0 THEN 3510
3460        OBF%(OTPTR%,2)=OBFN%
3470        OBF%(OBFN%,1)=OTPTR%
3480        OBF%(OBFN%,2)=0
3490        OTPTR%=OBFN%
3500        RETURN
3510        OBF%(OBFN%,1)=0
3520        OBF%(OBFN%,2)=0
3530        OTPTR%=OBFN%
3540        OHPTR%=OBFN%
3550        RETURN
3560        '
3570        '
3580        '          UNLINK AND CLEAR BUFFER
3590        '
3600        '
3610        IF UZRA%(UZRN%,0)=0 THEN RETURN
3620        UBN%=UZRA%(UZRN%,0)
3625        IF OBF%(UBN%,1)<0 THEN 3700
3630        IF OBF%(UBN%,1)=0 THEN OHPTR%=OBF%(UBN%,2)
3640        IF OBF%(UBN%,1)<>0 THEN OBF%(OBF%(UBN%,1),2)=OBF%(UBN%,2)
3650        IF OBF%(UBN%,2)=0 THEN OTPTR%=OBF%(UBN%,2)
3660        IF OBF%(UBN%,2)<>0 THEN OBF%(OBF%(UBN%,2),1)=OBF%(UBN%,1)
3670        OBF%(UBN%,1)=-1
3680        OBF%(UBN%,2)=0
3690        OBF%(UBN%,0)=0
3700        UZRA%(UZRN%,0)=0
3710        RETURN
3720        '
3730        '
3740        '
3750        ' PRINT OUTPUT BUFFER
3760        '
3770        '
3780        IF OBF%(OHPTR%,0)=0 THEN 3930
3790        PRINT#1,CHR$(&HC0);              'HEADER BYTE
3800        PRINT#1,CHR$(&H0);               'CONTROL BYTE
3810        FOR WC%=5 TO OBF%(OHPTR%,0)
3820        A$=CHR$(OBF%(OHPTR%,WC%))
3830        IF A$<>CHR$(&HC0) THEN 3870
3840        PRINT#1,CHR$(&HDB);
3850        PRINT#1,CHR$(&HDC);
3860        GOTO 3890
3870        PRINT#1,A$;
```

```
3880        IF A$=CHR$(&HDB) THEN PRINT#1,CHR$(&HDD);
3890        NEXT WC%
3900        PRINT#1,CHR$(&HC0);
3910        PRINT#1,CHR$(&HD);
3920        OBF%(OHPTR%,0)=0
3925        UZRA%(OBF%(OHPTR%,3),0)=0
3930        OBF%(OHPTR%,1)=-1
3935        OHPTR%=OBF%(OHPTR%,2)
3940        OBF%(OHPTR%,1)=0
3950        IF OHPTR%=0 THEN OTPTR%=0
3960        RETURN
3970        '
3980        '
3990        ' LORAN INPUT
4000        '
4010        '
4020        ON ERROR GOTO 4880
4030        A$=INPUT$(1,#2)
4040        ON ERROR GOTO 0
4050        IF LBF%(0)>0 THEN 4070
4060        IF A$="*" THEN 4120 ELSE RETURN
4070        IF LBF%(0)>1 THEN 4090
4080        IF A$<>"L" AND A$<>"S" THEN 4470    ELSE 4100   'CLEAR BUFFER
4090        IF A$=CHR$(&HD) THEN 4150
4100        IF A$=" " THEN A$="0"
4110        LBF%(LBF%(0))=ASC(A$)
4120        LBF%(0)=LBF%(0)+1
4130        RETURN
4140        '
4150        IF LBF%(1)=83 THEN 4300   ' "S"
4160        IF LBF%(0)<>19 THEN 4470    'CLEAR BUFFER
4170        LAT=((LBF%(4)-48)*10)+(LBF%(5)-48)
4180        LATD=(LBF%(7)-48)+((LBF%(6)-48)*10!)+((LBF%(8)-48)/10!)
4190        LATD=LATD+((LBF%(9)-48)/100!)
4200        LAT=LAT+(LATD/60!)
4210        IF LBF%(3)=83 THEN LAT=-LAT   'SOUTH
4220        LONG=((LBF%(12)-48)*100!)+((LBF%(13)-48)*10)+(LBF%(14)-48)
4230        LONGD=(LBF%(16)-48)+((LBF%(15)-48)*10!)+((LBF%(17)-48)/10!)
4240        LONGD=LONGD+((LBF%(18)-48)/100!)
4250        LONG=LONG+(LONGD/60!)
4260        IF LBF%(11)=87 THEN LONG=-LONG   'WEST
4270        LCM%=LCM% OR &H1
4280        GOTO 4400      'CLEAR BUFFER
4290        '
4300        IF LBF%(0)<>17 THEN 4470    'CLEAR BUFFER
4310        SN1=(LBF%(6)-48)+((LBF%(5)-48)*10!)+((LBF%(4)-48)*100!)
4320        SN2=(LBF%(11)-48)+((LBF%(10)-48)*10!)+((LBF%(9)-48)*100!)
4330        SN3=(LBF%(16)-48)+((LBF%(15)-48)*10!)+((LBF%(14)-48)*100!)
4340        SNM=SN1
4350        IF SN2<SNM THEN SNM=SN2
4360        IF SN3<SNM THEN SNM=SN3
4370        LCM%=LCM% OR &H2
4380        'PRINT SN1,SN2,SN3
4390        '
4400        ERC%=0
4410        TL=TIMER+5
```

```
4420        IF LCM%<>3 THEN 4470
4430        CLOSE #2
4440        TL=-1
4450        LCM%=-1
4460        GOSUB 2490
4470        LBF%(0)=0
4480        RETURN
4490        '
4500        '
4510        ' CHECK TIMERS
4520        '
4530        '
4540        T1=TIMER
4550        UZRN%=1
4560        IF STTS<0 THEN 4620
4570        IF SPT>T1 THEN 4620
4580        IF LCM%>=0 THEN 4620
4590        OPEN "COM2:1200,0,7" AS #2
4600        TL=T1+2
4610        LCM%=0
4620        IF TL<0 THEN 4680
4630        IF TL>T1 THEN 4680
4640        CLOSE #2
4650        PRINT "RECYCLE"
4660        OPEN "COM2:1200,0,7" AS #2
4670        TL=T1+10
4700        RETURN
4840        '
4850        '
4860        ' I/O ERROR ROUTINES
4870        '
4880        ER%=ERR
4890        ERC%=ERC%+1
4900        IF ERC%>10 THEN 4920
4910        RESUME 4470
4920        PRINT "I/O OVER"
4930        STOP
4940        '
4950        IRC%=IRC%+1
4960        IF IRC%<3 THEN RESUME 970
4970        CLOSE #1
4980        OPEN "COM1:1200,N,8" AS #1
4990        RESUME 1300
5000        '
5010        END
```

What is claimed is:

1. A stand alone multiple unit tracking system for tracking, reporting and recording the latitude and longitude position of a plurality of vessels, said tracking system comprising:

a base station;

a plurality of remote stations, each of said remote stations communicating with said base station and each of said remote stations being located on different ones of said vessels;

each of said remote stations having a Loran-C receiver means for generating longitude and latitude Geodetic coordinate positional data, first computer means for assembling said longitude and latitude Geodetic coordinate positional data into up-direction data packets for transmission to said base station, first receiver means for transmitting said up-direction data packets over a single channel to said base station, and first terminal node controller means for controlling said first transceiver means so that each of said remote stations are linked to said base station to allow for the transmission of said up-direction data packets to said base station; said base station having a second transceiver means for receiving said up-direction data packets from each of said remote stations, second terminal node controller means for controlling said second transceiver means so that said base station receives the up-direction data packets from each of said remote stations, monitor means for electronically displaying a range map which shows the location of said base station and each of said remote stations with respect to said base station and second computer means for storing therein x coordinate and y coordinate digital map data and for providing said x and y coordinate digital map data to said monitor means allowing said monitor means to visually display said range map;

said second computer means being adapted to disassemble said up-direction data packets, to convert said longitude and latitude Geodetic coordinate positional data from said dissembled data packets into x and y coordinate digital position data for plotting on said range map and then provide said x and y coordinate positional data to said monitor means so as to allow said monitor means to visually display the present position of each of said remote stations on said range map; and each of said remote stations being adapted to monitor said single channel such that when said single channel is clear for transmission to said base station each of said remote stations with longitude and latitude positional data to transmit to said base station can link and then transmit said positional data to said base station;

each of said remote stations requesting an acknowledge message after transmitting at least ten up-direction data packets;

said base station being adapted to provide said acknowledge message to each of said remote stations requesting said acknowledge message; and a plurality of relay stations, each of said relay stations having a transceiver and a terminal node controller connected to said transceiver, said terminal node controller and said transceiver at each of said relay stations being adapted to link and then transmit said up-direction data packets from one or more of said remote stations to said base station and transmit said acknowledge message to each of said remote stations requesting said acknowledge message.

2. The stand alone multiple unit tracking system of claim 1 wherein each of said up-direction data packets comprises:

a pair of eight bit flags located at the beginning and end of each up-direction data packet;

an address field following the first of said eight bit flags, said address field identifying each of said remote stations providing said up-direction data packet and said base station;

an eight bit control field following said address field indicating whether each of said up-direction data packets includes position information or a status message; and an information field following said control field, said information field including the longitude and latitude positional data provided by each of said remote stations.

3. A stand alone multiple unit tracking system for tracking, reporting and recording the latitude and longitude position of a plurality of vessels, said tracking system comprising:

a base station;

a plurality of remote stations, each of said remote stations communicating with said base station and each of said remote stations being located on different ones of said vessels;

each of said remote stations having a Loran-C receiver means for generating longitude and latitude Geodetic coordinate positional data, first computer means for assembling said longitude and latitude Geodetic coordinate positional data into up-direction data packets for transmission to said base station, first receiver means for transmitting said up-direction data packets over a single channel to said base station, and first terminal node controller means for controlling said first transceiver means so that each of said remote stations are linked to said base station to allow for the transmission of said up-direction data packets to said base station;

said base station having a second transceiver means for receiving said up-direction data packets from each of said remote stations, second terminal node controller means for controlling said second transceiver means so that said base station receives the up-direction data packets from each of said remote stations, monitor means for electronically displaying a range map which shows the location of said base station and each of said remote stations with respect to said base station and second computer means for storing therein x coordinate and y coordinate digital map data and for providing said x and y coordinate digital map data to said monitor means allowing said monitor means to visually display said range map;

said second computer means being adapted to disassemble said up-direction data packets, to convert said longitude and latitude Geodetic coordinate positional data from said dissembled data packets into x and y coordinate digital position data for plotting on said range map and then provide said x and y coordinate positional data to said monitor means so as to allow said monitor means to visually display the present position of each of said remote stations on said range map;

each of said remote stations being adapted to monitor said single channel such that when said single channel is clear for transmission to said base station, each of said remote stations with longitude and latitude positional data to transmit to said base station can link and then transmit said positional data to said base station;

each of said remote stations requesting an acknowledge message after transmitting at least ten up-direction data packets;

said base station being adapted to provide said acknowledge message to each of said remote stations requesting said acknowledge message;

a plurality of relay stations, each of said relay stations having a transceiver and a terminal node controller connected to said transceiver, said terminal node controller and said transceiver at each of said relay stations being adapted to link and then transmit said up-direction data packets from one or more of said remote stations to said base station and transmit said acknowledge message to each of said remote stations requesting said acknowledge message; and said base station having timer means for informing an operator at said base station that said base station has not received an up-direction data packet from one of said remote stations within a predetermined time period;

the operator at said base station being informed that one of said remote stations has not provided an up-direction data packet;

said base station transmitting to said one remote station an initiate message to reactivate said one remote station such that said one remote station will transmit said up-direction data packets.

4. The stand alone multiple unit tracking system of claim 3 wherein each of said up-direction data packets comprises:

a pair of eight bit flags located at the beginning and end of each up-direction data packet;

an address field following the first of said eight bit flags, said address field identifying each of said remote stations providing said up-direction data packet and said base station;

an eight bit control field following said address field indicating whether each of said up-direction data packets includes position information or a status message; and an information field following said control field, said information field including the longitude and latitude positional data provided by each of said remote stations.

5. A stand alone multiple unit tracking system for tracking, reporting and recording the latitude and longitude position of a plurality of vessels, said tracking system comprising:

a base station;

a plurality of remote stations, each of said remote stations communicating with said base station and each of said remote stations being located on different ones of said vessels;

each of said remote stations having a Loran-C receiver means for generating longitude and latitude Geodetic coordinate positional data, first computer means for assembling said longitude and latitude Geodetic coordinate positional data into up-direction data packets for transmission to said base station, first transceiver means for transmitting said up-direction data packets over a single channel to said base station, and first terminal node controller means for controlling said first transceiver means so that each of said remote stations are linked to said base station to allow for the transmission of said up-direction data packets to said base station;

said base station having a second transceiver means for receiving said up-direction data packets from each of said remote stations, second terminal node controller means for controlling said second transceiver means so that said base station receives the up-direction data packets from each of said remote stations, monitor means for electronically displaying a range map which shows the location of said base station and each of said remote stations with respect to said base station and second computer means for storing therein x coordinate and y coordinate digital map data and for providing said x and y coordinate digital map data to said monitor means allowing said monitor means to visually display said range map;

said second computer means being adapted to disassemble said up-direction data packets, to convert said longitude and latitude Geodetic coordinate positional data from said dissembled data packets into x and y coordinate digital position data for plotting on said range map and then provide said x and y coordinate positional data to said monitor means so as to allow said monitor means to visually display the present position of each of said remote stations on said range map;

each of said remote stations being adapted to monitor said single channel such that when said single channel is clear for transmission to said base station, each of said remote stations with longitude and latitude positional data to transmit to said base station can link and then transmit said positional data to said base station;

each of said remote stations being adapted to request an acknowledge message after transmitting ten up-direction data packets having longitude and latitude Geodetic coordinate positional data therein;

said base station being adapted to provide said acknowledge message to each of said remote stations requesting said acknowledge message;

a plurality of relay stations, each of said relay stations having a transceiver and a terminal node controller connected to said transceiver and a terminal node controller connected to said transceiver, said terminal node controller and said transceiver at each of said relay stations being adapted to link and then transmit said up-direction data packets from one or more of said remote stations to said base station and transmit said acknowledge message to each of said remote stations requesting said acknowledge message;

said base station having first timer means for informing an operator at said base station that said base station has not received an up-direction data packet from one of said remote stations within a predetermined time period;

the operator at said base station being informed that one of said remote stations has not provided an up-direction data packet;

said base station transmitting to said one remote station an initiate message to reactive said one remote station such that said one remote station will transmit said up-direction data packets; and each of said remote stations being adapted to enter into a quiescent state after transmitting twenty up-direction packets to said base stations without receiving said acknowledge message from said base station, each of said remote stations when in said quiescent state not transmitting up-direction data packets to said base station.

6. The stand alone multiple unit tracking system of claim 5 wherein each of said up-direction data packets comprises:

a pair of eight bit flags located at the beginning and end of each up-direction data packet;

an address field following the first of said eight bit flags, said address field identifying each of said remote stations providing said up-direction data packet and said base station;

an eight bit control field following said address field indicating whether each of said up-direction data packets includes position information or a status message; and an information field following said control field, said information field including the longitude and latitude positional data provided by each of aid remote stations.

* * * * *